(12) United States Patent
Schactman et al.

(10) Patent No.: US 10,676,037 B2
(45) Date of Patent: Jun. 9, 2020

(54) MODULAR ROOF RACK CLAMPING SYSTEM

(71) Applicant: Grip Racks LLC, St. Louis, MO (US)

(72) Inventors: Eric Darren Schactman, St. Louis, MO (US); Brandon Trostrud, St. Louis, MO (US); Brandon Hefer, St. Louis, MO (US)

(73) Assignee: Grip Racks LLC, St. Louis, MO (US)

( * ) Notice: Subject to any disclaimer, the term of this patent is extended or adjusted under 35 U.S.C. 154(b) by 0 days.

(21) Appl. No.: 15/955,499

(22) Filed: Apr. 17, 2018

(65) Prior Publication Data

US 2018/0229665 A1 Aug. 16, 2018

Related U.S. Application Data

(63) Continuation-in-part of application No. 15/273,537, filed on Sep. 22, 2016, now Pat. No. 9,950,675.

(60) Provisional application No. 62/630,697, filed on Feb. 14, 2018, provisional application No. 62/221,660, filed on Sep. 22, 2015.

(51) Int. Cl.
| | |
|---|---|
| *B60R 9/04* | (2006.01) |
| *B60R 9/048* | (2006.01) |
| *B60R 9/058* | (2006.01) |
| *B60R 9/10* | (2006.01) |
| *F16B 2/10* | (2006.01) |
| *F16B 2/18* | (2006.01) |
| *F16B 2/12* | (2006.01) |

(52) U.S. Cl.
CPC .............. *B60R 9/048* (2013.01); *F16B 2/10* (2013.01); *F16B 2/12* (2013.01); *F16B 2/185* (2013.01); *B60R 9/04* (2013.01); *B60R 9/058* (2013.01); *B60R 9/10* (2013.01)

(58) Field of Classification Search
CPC ......... B60R 9/045; B60R 9/048; B60R 9/058; B60R 2011/0071; B60R 2011/0059; F16B 2/12; F16B 2/18; B62J 7/08; B25B 5/163; B25B 7/123; B25B 7/02
USPC ................................................. 224/319, 558
See application file for complete search history.

(56) References Cited

U.S. PATENT DOCUMENTS

| | | | |
|---|---|---|---|
| 952,079 A | 3/1910 | McIntire | |
| 1,036,093 A | 8/1912 | Gatten | |
| 1,334,965 A * | 3/1920 | Ridings | B25B 7/04 |
| | | | 81/423 |

(Continued)

OTHER PUBLICATIONS

International Search Report, International Application No. PCT/US2016/53178, dated Dec. 15, 2016, 3 pages.

*Primary Examiner* — Justin M Larson
(74) *Attorney, Agent, or Firm* — Creativenture Law, LLC; Dennis JM Donahue, III; Kevin Staed

(57) ABSTRACT

A roof rack system has a clamping system comprised of handles, an actuator, and a pair of jaws. The jaws provide a universal clamping system that will attach to most roof rack cross bars with an easy-on/easy-off, quick-release actuator, such as a ratcheting mechanism or lever system, that will integrate with a wide variety of accessories. The preferred actuator includes a lever mechanism with a linkage between the trigger handle and the elongated handgrip. An adjustment knob is used to adjust the longitudinal distance of the distal end of the linkage from the back end of the handgrip. This system is easier to use, more versatile, and less expensive than conventional roof rack accessory systems.

20 Claims, 14 Drawing Sheets

(56) References Cited

U.S. PATENT DOCUMENTS

| | | | |
|---|---|---|---|
| 2,514,130 A | 7/1950 | Jones | |
| 3,354,759 A | 11/1967 | Cook | |
| 3,427,016 A | 2/1969 | Arris | |
| 3,446,102 A * | 5/1969 | Hallmark | B25B 7/02 |
| | | | 81/369 |
| 4,220,322 A | 9/1980 | Obday | |
| 4,462,284 A * | 7/1984 | Gowers | B25B 7/00 |
| | | | 81/367 |
| 4,601,221 A * | 7/1986 | Kalkbrenner | B25B 7/123 |
| | | | 269/258 |
| 4,673,174 A * | 6/1987 | Tabbert | B25B 5/04 |
| | | | 269/228 |
| 4,747,588 A * | 5/1988 | Dillhoff | B25B 5/12 |
| | | | 269/258 |
| 4,757,929 A | 7/1988 | Nelson | |
| 4,900,203 A | 2/1990 | Pope | |
| 4,926,722 A | 5/1990 | Sorensen | |
| 5,005,449 A | 4/1991 | Sorensen | |
| 5,052,251 A * | 10/1991 | Mills | B25B 7/123 |
| | | | 81/324 |
| 5,076,479 A | 12/1991 | Davison | |
| 5,119,980 A | 6/1992 | Grim | |
| 5,197,359 A * | 3/1993 | Mills | B25B 7/00 |
| | | | 81/324 |
| 5,501,126 A * | 3/1996 | Wright | B25B 7/00 |
| | | | 81/302 |
| 5,556,221 A | 9/1996 | Brunner | |
| 5,738,258 A | 4/1998 | Farrow | |
| 5,769,292 A | 6/1998 | Cucheran | |
| 5,779,116 A | 7/1998 | Rösch | |
| 5,862,964 A | 1/1999 | Moliner | |
| 5,887,461 A * | 3/1999 | Heffley | B62H 3/02 |
| | | | 211/5 |
| 6,000,686 A | 12/1999 | Yates | |
| 6,240,815 B1 | 6/2001 | Huang | |
| 6,283,310 B1 | 9/2001 | Dean | |
| 6,322,279 B1 | 11/2001 | Yamamoto | |
| 6,327,944 B1 * | 12/2001 | Liao | B25B 7/02 |
| | | | 30/260 |
| 6,336,386 B1 | 1/2002 | Lee | |
| 6,367,787 B1 | 4/2002 | Poole | |
| 6,422,441 B1 | 7/2002 | Settelmayer | |
| 6,431,423 B1 | 8/2002 | Allen | |
| 6,568,644 B2 | 5/2003 | Pedersen | |
| 6,601,838 B1 * | 8/2003 | Gilley | B25B 7/02 |
| | | | 269/228 |
| 6,676,120 B1 | 1/2004 | Halbeck | |
| 6,681,971 B2 | 1/2004 | Laverack | |
| 6,684,667 B2 | 2/2004 | Young | |
| 6,685,070 B2 | 2/2004 | Szigeti | |
| D491,434 S * | 6/2004 | Noniewicz | D8/52 |
| 6,758,380 B1 | 7/2004 | Kolda | |
| 6,793,186 B2 | 9/2004 | Pedersen | |
| 6,899,552 B1 * | 5/2005 | Robinson | H01R 11/24 |
| | | | 439/133 |
| 6,910,429 B1 * | 6/2005 | Matay | B25H 3/06 |
| | | | 108/152 |
| 7,086,312 B1 * | 8/2006 | Tortolani | B25B 7/10 |
| | | | 81/355 |
| 7,104,166 B1 * | 9/2006 | Wong | B25B 5/12 |
| | | | 81/180.1 |
| 7,108,163 B1 | 9/2006 | Pedrini | |
| 7,226,047 B1 * | 6/2007 | Beauchamp | B23K 37/0533 |
| | | | 269/43 |
| 7,357,283 B2 | 4/2008 | Settelmayer | |
| D571,631 S * | 6/2008 | Gandy, III | D8/52 |
| 7,380,640 B1 * | 6/2008 | Kemp | E06C 7/50 |
| | | | 182/107 |
| 7,451,968 B2 * | 11/2008 | Geldert | B25B 5/163 |
| | | | 269/258 |
| 7,784,774 B2 | 8/2010 | Fuller | |
| 8,020,737 B2 | 9/2011 | Sweeney | |
| 8,177,203 B2 | 5/2012 | Alexander | |
| 8,210,407 B2 | 7/2012 | Sautter | |
| 8,347,765 B2 * | 1/2013 | Chen | B25B 7/04 |
| | | | 81/177.7 |
| 8,496,145 B2 | 7/2013 | Sautter | |
| 8,668,125 B2 | 3/2014 | Williams | |
| 8,807,407 B2 | 8/2014 | Hubbard | |
| 9,321,168 B2 * | 4/2016 | Brassette | B25H 1/04 |
| D769,110 S * | 10/2016 | Altemus | D8/394 |
| 9,950,675 B2 * | 4/2018 | Schactman | B60R 9/048 |
| 10,328,552 B2 * | 6/2019 | Forseth | B25B 7/02 |
| 2003/0196526 A1 * | 10/2003 | Wang | B25B 7/02 |
| | | | 81/367 |
| 2005/0263554 A1 | 12/2005 | Naslund | |
| 2006/0248990 A1 * | 11/2006 | Bertholf | A62B 99/00 |
| | | | 81/367 |
| 2013/0175308 A1 | 7/2013 | Sautter | |

\* cited by examiner

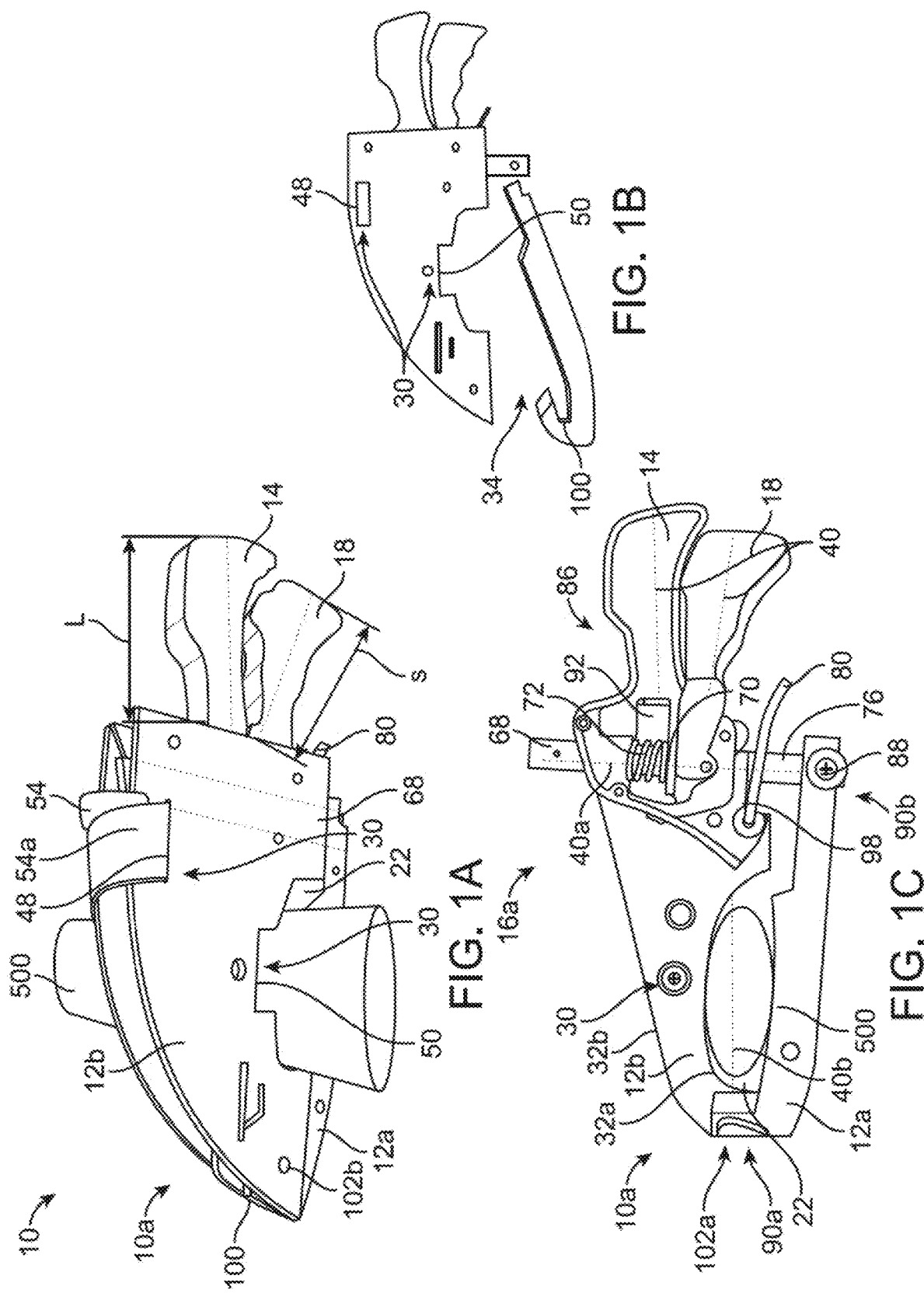

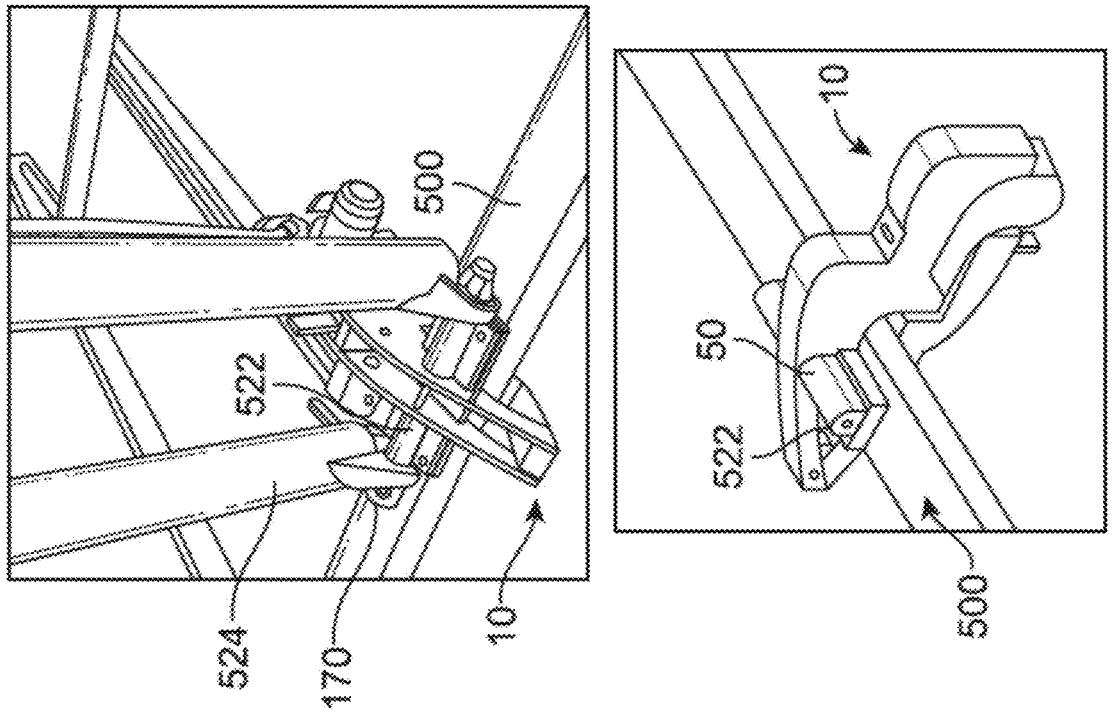
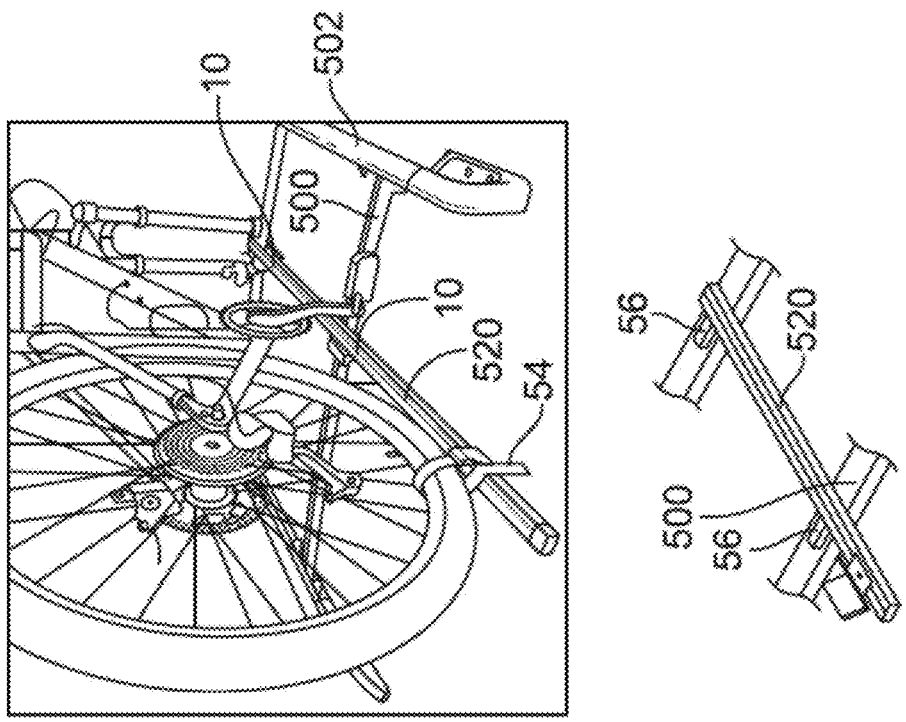
FIG. 2C
FIG. 2D

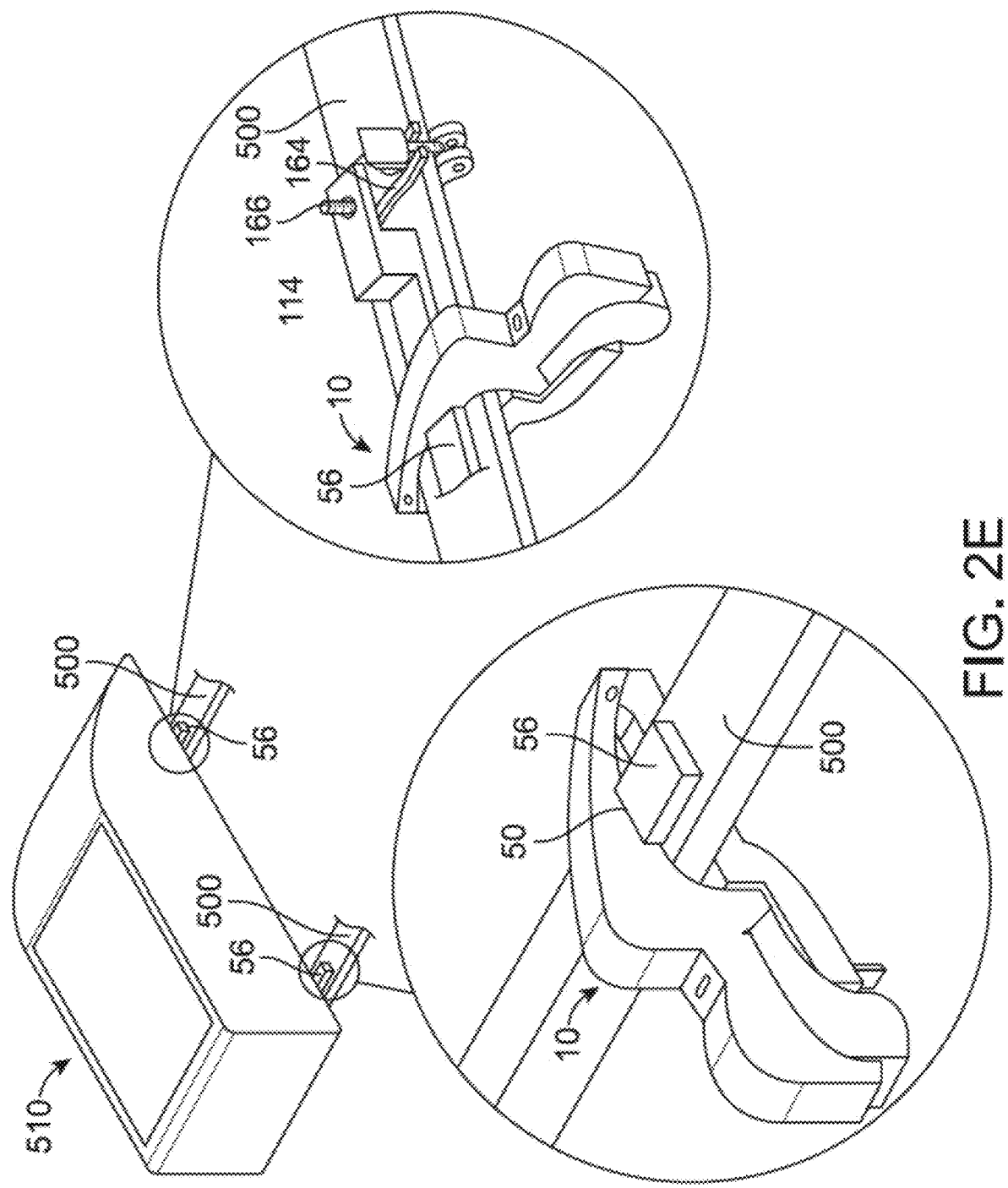

MODULAR ROOF RACK CLAMPING SYSTEM

CROSS-REFERENCE TO RELATED APPLICATIONS

This application claims priority from U.S. Provisional Patent Application No. 62/630,697 filed on Feb. 14, 2018 and is a continuation-in-part of U.S. patent application Ser. No. 15/273,537 filed on Sep. 22, 2016 which claims priority from U.S. Provisional Patent Application No. 62/221,660 filed on Sep. 22, 2015.

STATEMENT REGARDING FEDERALLY SPONSORED RESEARCH

Not Applicable.

APPENDIX

Not Applicable.

BACKGROUND OF THE INVENTION

Field of the Invention

The present invention relates to roof racks, and more particularly to clamping devices used to hold items to roof racks.

Related Art

Vehicle roof racks are more prevalent today than ever. Many vehicles have factory-installed roof racks on their base models. Vehicle owners have tremendous numbers of options for different types of roof racks and various accessories that clamp on or are otherwise affixed to the roof racks. However, current roof rack systems are restrictive in what they can carry, components are challenging to put on and take off, and roof rack accessories are expensive. In addition, roof racks differ widely from vehicle to vehicle, and manufacturer to manufacturer which results in a wide array of components and options that make it difficult for the consumer, and an inventory and logistics challenge for distributors and retailers. Accordingly, there remains a need for a simpler roof rack clamping system that is more economical, provides versatility and is easier to use than the currently available accessories.

Roof racks systems contain roof rails, crossbars, and the accessories that are used to hold items to the roof racks. The roof rack side rails are positioned parallel to the sides of the vehicle, while the crossbars are positioned transverse between the side rails across the vehicle (from side-to-side). Roof rails attach to the vehicle in a variety of ways and the crossbars connect to these roof rails. Some vehicles and systems eliminate the roof rails and have the crossbars mounted directly to the vehicle roof. The roof rack accessories connect to the crossbars by a variety of methods, and typically include a clamp with jaws on opposite sides of the crossbar (top to bottom or front to back), one end which may be permanently closed (such as disclosed in U.S. Pat. No. 6,793,186) or could be used to adjust the distance between the top side and bottom side for crossbars having different thicknesses (such as disclosed in U.S. Pat. No. 8,210,407), and another end which has a closure and adjustment mechanism.

Current roof rack clamping systems use different types of closure and adjustment mechanisms; many of the clamping devices having a threaded bolt connector that close and lock the jaws of the clamp, and other clamping devices use a buckle or strap. To adjust the tightness of the jaws and lock the closure in place, most clamping systems may use a device that is permanently connected to the clamp, such as a ratchet, a lever, a wing nut or nut with a knob, and some require the use of a separate tool such as a wrench to tighten a standard nut. In most designs, the clamping jaws fit around the front and back end of the crossbar (such as disclosed in the '186 and '407 Patents); in some other designs, the jaws fit around the front and back end of the crossbar rather than clamping around the top and bottom, such as disclosed in U.S. Pat. No. 8,496,145, and in at least one design, the jaws fit around the side rail, such as disclosed in U.S. Pat. No. 5,779,116. In yet another alternative design, a clamping device may have a strap and ratchet in which the strap actually serves both the role of one jaw of the clamp and the role of the closure mechanism, such as disclosed in U.S. Pat. No. 6,322,279.

The clamping systems connect the accessories to the roof racks, and the accessories hold the items being transported such as bikes, skis, canoes, kayaks, roof boxes, and cargo bins. Accordingly, the clamping devices have attachment mechanisms to which the accessories are connected. In many current roof racks, the accessories are limited to mostly function for one particular type of sports equipment (carry bikes, canoes, skis, or some other type of sports equipment) but not all types of sports equipment or function to hold cargo carriers on the roof rack which results in additional expense when different types of equipment need to be carried. In many instances, the accessory has an equipment-specific connector, such as a skewer for securing bicycle forks or straps for securing a bicycle tire (as disclosed in the '407 Patent), or the accessory may have a universal connector that could be used to hold different accessory parts for various types of cargo. Universal connectors can be a threaded bolt, such as disclosed in the '186 Patent, or by some other type of mount, such as disclosed in U.S. Pat. Nos. 6,322,279 and 7,357,283.

Most current clamping systems do not offer accessories for transporting large items that do not fit in the cargo carriers, and the accessories that are used to hold sports equipment are not suitable for large items such as lumber, piping, conduit, ladders, rugs, Christmas trees, etc. Even in those roof racks which have universal connectors and which may be used for oversized items, the accessories are often hard to attach and remove from the roof rack, resulting in most users leaving the components on the roof rack even when not in use. Currently known designs with a universal roof rack clamp which can be used for sports equipment, cargo carriers or oversized items are difficult to use, take significant time to install and remove, require two hands to operate, and/or are insecure. None of the prior art clamps have an elongated handgrip and a trigger handle that extend in the same direction to allow for single-handed installation of the clamp on the roof rack's crossbar and to provide for an actuated clamping mechanism. It would be beneficial to have a roof rack clamp that can be installed onto the roof rack with a single hand. It would be an additional benefit to have a roof rack clamp with an elongated handgrip and a trigger handle to provide a mechanical advantage for an actuated clamping mechanism.

SUMMARY OF THE INVENTION

A clamping system having opposing jaws, an elongated handgrip, an actuator, a trigger handle, and a mount. The opposing jaws are comprised of a fixed jaw and a movable jaw, where jaws can be opened and connected to a roof rack crossbar and closed onto the roof rack crossbar to secure the clamp and mounted accessories to the roof rack. The actuator can be a ratchet or a lever that is operated by the trigger handle. The jaws have one connection at their proximal ends where they extend from the handgrip, the trigger handle, and the actuator and can also have a second connection at their distal ends. A locking fastener, locking tabs or other locking means prevents the jaws from being opened when the lock is engaged and the jaws are closed. The lever preferably has a linkage between the trigger handle and the elongated handgrip, and an adjustment knob is used to adjust the longitudinal distance of the distal end of the linkage from the back end of the handgrip.

Further areas of applicability of the present invention will become apparent from the detailed description provided hereinafter. In particular, each one of the various embodiments of the present invention have various orientations, configurations, and arrangements of the components that provide additional advantages over the prior art references. Accordingly, it should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detail description and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore the drawings are not necessarily to scale. In addition, in the embodiments depicted herein, like reference numerals in the various drawings refer to identical or near identical structural elements.

FIGS. 1A-1C are side views of a slide ratchet bar clamp according to the present invention.

FIGS. 2A-2E display the clamp of FIGS. 1A-1C as it is used with various mounting accessories to hold objects to the roof rack.

DETAILED DESCRIPTION OF THE PREFERRED EMBODIMENTS

Figure 2A:
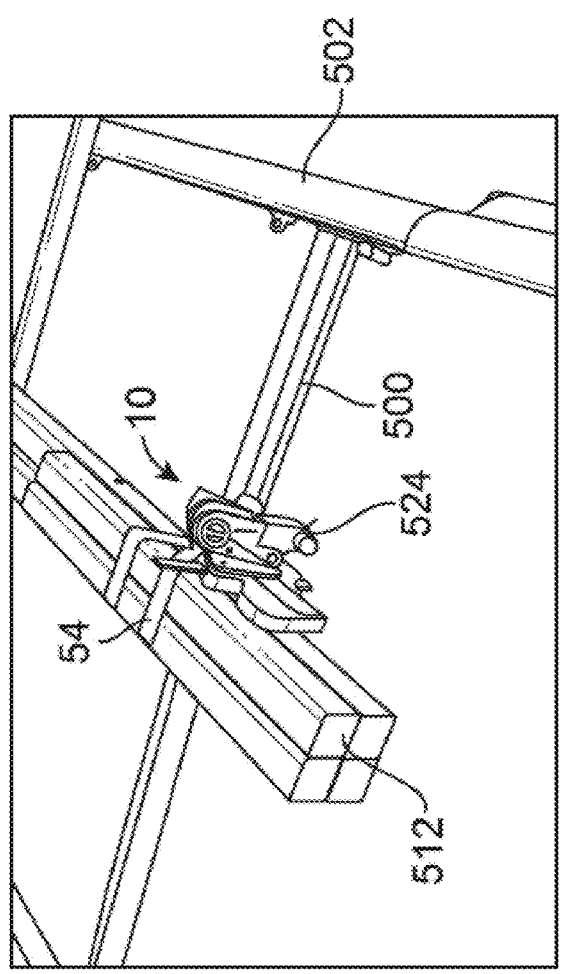

The following description of the preferred embodiment(s) is exemplary in nature rather than being limiting and corresponds with the drawings shown below and attached hereto.

The present invention provides a secure clamping system that is significantly easier to use than currently known systems and takes much less time to install and remove from the roof rack. Additionally, the clamping devices of the present invention allow for single-handed operation when installing the clamps onto roof rack crossbars. Several embodiments of the roof rack clamps according to the present invention are particularly described below, including a bar clamp, a ratchet clamp and a vice grip clamp. Various orientations of the clamps are possible with the jaws of the clamp. For example, as explained in detail below, the bar clamp can be in a vertical or horizontal orientation relative to the jaws.

As shown in each one of the embodiments, the clamp 10 of the present invention includes a pair of opposing jaws 12, an elongated handgrip 14, a trigger handle 18, a clamp actuator 16, and a mount 30. The jaws include a fixed jaw 12a and a movable jaw 12b opposing the fixed jaw 12a. The movable jaw 12b has a spaced apart position 24a and a proximate position 24b relative to the fixed jaw 12a, and the pair of jaws 12 has an opened configuration 26 and a closed configuration 28 when the movable jaw 12b is in its spaced apart position 24a and proximate position 24b, respectively. Each one of the jaws 12 has an interior surface 32a and an outer surface, and the interior surface 32a preferably has a resilient pad 44. The crossbar 500 fits through an opening 34 between the pair of jaws 12 when they are in their opened configuration 26, and the crossbar 500 is contacted by the interior surface 32a when the jaws are in their closed configuration 28. Accordingly, an interior space 22 is formed between the fixed jaw and the movable jaw even when the jaws are in the closed orientation with interior surface that face each other and bound the interior space. The interior space has a length (l), a height (h) transverse to the length and a width (w) orthogonal to the length and height when the jaws are the closed orientation. The length is preferably longer than the height and width, and the height's vertical distance is on the same order of magnitude as the width's transverse distance in the closed orientation. When the pair of jaws 12 are in the closed configuration 28, the elongated handgrip 14 has a longitudinal length or span (L) that is on the same order of magnitude as the length (l) of the interior space 22 and may almost be equal (L ≈ l). The trigger handle 18 has a span (s) is preferably at least half as long as the elongated handgrip 14 (s ≥ ½L). The ends of the elongated handgrip and trigger handle proximate to the clamp actuator are spaced by a distance (D) that is less than the span (s) of the trigger handle (D < s).

As explained below for the various embodiments of the clamp, the mount 30 is preferably formed as a part of either of the jaws or is attached to one of the jaws. For example, as an example of mounts that are integrally formed with the jaws, a slot 48 can extend through the sides of the jaws or the interior surface 32a of the upper jaw 12b can have a notch 50. A strap 54 can be passed through slot, and the either a strap 54 or an accessory foot 56 can be positioned within the notch. The mount 30 may alternatively be a bracket 52 or other fastener that mates with and attaches to a section of the jaw, and the bracket of the present invention can be modular brackets or a bracket that mates with different accessory mount inserts that connect to different accessory mounts.

The elongated handgrip 14 connects to the fixed jaw 12a at the proximate side of the fixed jaw 12a, and the handgrip 14 extends away from the proximate side of the fixed jaw 12a from a proximal end 14a to its distal end 14b. Depending on the particular embodiment, the trigger handle 18 is pivotally mounted to the proximal end of either the fixed jaw 12a or the movable jaw 12b. Regardless of the particular embodiment, the proximal end 18a the trigger handle 18 is connected to the actuator mechanism 16 and is moved relative to the elongated handgrip 14 to operate the actuator 16. The trigger handle also extends outwardly away from the fixed jaw to its distal end 18b in the same general direction as the handgrip such that the longitudinal axes 40 of the trigger handle and the handgrip are either close to being parallel or are at a very shallow acute angle relative to each other when the clamp is in its closed configuration, preferably less than 10°, and is at a small acute angle when the clamp is in its opened configuration, preferably less than 30°, and less than 45° in all embodiments. The orientation of the trigger handle relative to the handgrip allows for single-handed operation of the clamp by a user.

The actuator 16 is connected between the elongated handgrip 14 and the trigger handle 18 and also connects the pair of jaws 12 to each other. The components of the actuator assembly may directly connect the jaws to each other as in the embodiments of the slide ratchet clamp and fulcrum ratchet clamp as described below or may indirectly connect the jaws to each other, such as through the trigger handle, such as in the locking lever clamp embodiment that is also described below. In each one of the embodiments, the actuator assembly also has a clamp release and a handle spring. Depending on the particular clamp embodiment, the clamp release is connected to the slide ratchet, the fulcrum ratchet, or the locking lever, and the handle spring is in operative engagement between the trigger handle and either the handgrip or the locking lever such that it biases the trigger handle away from the handgrip.

The particular components of the actuator assemblies are described for each one of the clamp embodiments below. It will be appreciated that the clamp release can be a braking lever 80, a thumb slider 106, a ratchet locking pin 146, or a release lever 158, and these optional structures for the clamp release can be situated at different locations depending on the particular type of actuator mechanism being used. Similarly, it will be appreciated that the particular types of handle spring, such as a compression spring 72 or a tension spring 132, and its location within the clamp also varies depending on the particular type of actuator mechanism.

FIGS. 1A-1C show the vertical bar clamp 10a with two interconnected and interlocking parts, an upper fixed jaw 12a and a lower movable jaw 12b. The upper clamp part has a ratcheting mechanism 86 with a flat-sided bar 76 serving as the connecting member 68 between the upper and lower clamp parts. The flat-sided bar 76 moves in the vertical direction through the handgrip 14 when the lever handle 18 is compressed. As the lever handle 18 is compressed, a driving lever 70 engages the connecting member 68 and forces it in the vertical direction to close the clamp 10. The ratcheting mechanism 86 and the connecting member 68 force the upper and lower clamp parts together against the top and bottom of the crossbar 500 to hold the clamp 10 securely in place on the vehicle roof rack 502. The two clamp parts connect on one side of the crossbar in a pivoting connection point 90 and on the other side of the crossbar they connect via the connecting member 68.

One embodiment of the ratcheting mechanism 86 is comprised of a cavity 92. The connecting member 68 is a flat-sided bar 76 that passes through a hole in the elongated grip 14, into the cavity 92, and through a hole in the trigger handle. Within the cavity, a driving lever 70 is situated on the connecting member and proximate to the top of the trigger handle 18. A compression coil spring 72 is situated around the flat-sided bar 76 and is compressed between the driving lever 70 on the trigger handle 18 and the top of the cavity 92 in the elongated grip 14. In the standby position, the driving lever is perpendicular to the connecting member. When the trigger handle is compressed, the driving lever engages the connected member and moves from perpendicular to a position towards vertical. The force of the driving lever to the connected member incrementally moves the connecting member upwards, creating a compression between the upper and lower jaw. In the standby position 94, the driving lever 70 rests on the trigger handle 18 within the cavity 92 and the flat-sided bar 76 is free to move.

The flat-sided bar 76 extends through the bottom via the hole of the trigger handle 18 and through an opening in a braking lever 80. The braking lever 80 is held within a recess of the trigger handle 18 and extends outwardly away from the upper jaw 12b. A braking spring 98 is located within the trigger handle 18 and applies a force to the braking lever 80 that keeps the braking lever 80 in place. The braking lever 80 is biased to bind against the flat-sided bar 76 to prevent movement, keeping the flat-sided bar 76 in place. When the braking spring 98 is compressed by the breaking lever 80 and disengaged from the flat-sided bar 76, the flat-sided bar 76 is free to slide in either direction.

Connection points 90a, 90b between the upper and lower clamps may take various forms. As shown in FIGS. 1A and 1B, the lower clamp part 12a may have a hook 100 that engages a pin 102 or a similar component in the upper clamp 12b part for fastening. Once the lower clamp 12a part is put in place, then lever handle 18 is compressed to tighten the clamp 10 on to the crossbar 500. One or both of the connection points 90a, 90b between the may be detachable upper and lower clamps. In the case where both connection points are detachable, such as shown in FIG. 1B, the entire lower clamp part 12a can be removed from the upper clamp part 12b. At least one side of the jaws are detachable from each other to produce an opening 34 for the crossbar 500. As shown in FIG. 1C, the connection point 90b to the connecting member 68 can be a removable pin 88, while the other connection point 90a is a pivot point 102 that is not detachable. A user can remove the pin 88 to open the back of the clamp 10 for placing on the crossbar 500, and then the handle 18 is compressed to tighten the clamp 10.

The pivoting connection point 90 between the upper and lower clamp parts may be a fixed pivot point 102a, or a detachable pivot point 102b. This connecting point 90 may also be adjustable to allow the size of the clamp's opening 34 to be varied. Different size openings allow the clamp to be used with a wide variety of crossbar 500 sizes. These features allow the user to easily and quickly attach and remove the clamp 10 from the crossbars 500. In this embodiment, the longitudinal axis 40a of the flat-sided bar is substantially perpendicular to the longitudinal axis 40b of the interior space, and the longitudinal axes 40 of the trigger handle and the handgrip are substantially aligned with the longitudinal axis 40b of the interior space.

The clamp 10 can have a strap 54 that is integral to the clamp or may be added to the clamp. When the clamp 10 is attached securely to the rack 500, the strap 54 can be used to securely hold items to the roof rack 502. The strap 54 can be connected to the clamp 10 at a fixed end 54a and may have a free end 54b that can be wrapped around and/or through the item or items to be secured to the roof rack and transported. The free end 54b is then passed through a locking mechanism 110 within the clamp 10 or on another free end of the strap. When the clamp 10 is moved into its closed configuration, it secures the strap to the crossbar.

Figure 2B:
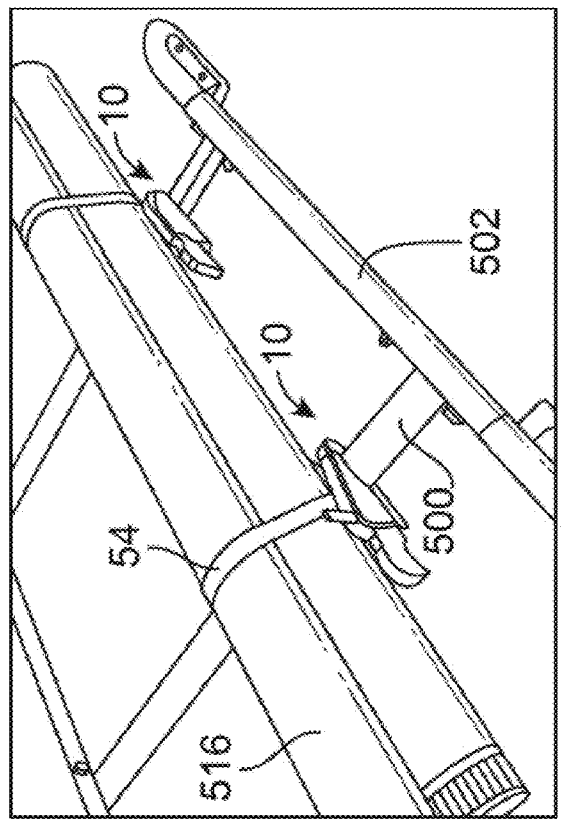

The use of the clamp 10 with various mounting accessories is shown in FIGS. 2A-2E as it holds objects to the roof rack. Common items and equipment may be secured to roof racks using the clamp, including lumber 512, piping 516, molding, ladders, and rugs. It will be appreciated that many other oversized and/or irregular shaped items can be held in place using the clamps 10 and straps 54, such as Christmas trees, canoes, kayaks and mattresses. The strap may be weather-resistant webbing (such as nylon), rope, or stainless-steel cabling. In a variation, the strap 54 and its locking mechanism 110 is a separate mechanism from the ratcheting mechanism 86 and secures the strap 54 alternately with a cam lock, buckle, or other similar device. As shown in FIG. 2A, a separate strap ratchet 524 can also be connected to the strap 54 to pull the strap taut around the items being secured to the roof rack. As shown in FIG. 2B, the strap 54 can be used with the clamp 10 alone to secure items to the roof rack 502.

As the popularity of roof rack systems has increased, so has the variation in the profile of the crossbars 500. The clamp is adapted to fit on a wide variety of crossbar 500 profiles (round, rectangular, and aero, for example). The cross-sectional opening 22 of the clamp 10 can accept inserts with profiles that match specifically shaped crossbars 500. The inserts preferably snap securely into the upper and lower clamp parts. At the interface between the insert and the crossbar, the inserts have an appropriate material, such as rubber or another resilient and flexible material, which allows for good compression and fit while protecting the crossbars 500 from damage or scratching.

The clamp 10 has an accessory notch 50 in the upper jaw 12b, allowing the clamp 10 to securely hold the roof rack accessories. Accessories such as roof boxes and other cargo bins 510, bike racks 520, kayak/canoe holders, etc., could have an accessory foot 56 which fits into the clamp 10, such as by fitting within the notch 50 in the clamp. The notch 50 and foot 56 fit together so that once the clamp 10 is secured to the crossbar 500, the clamp 10 holds the accessory securely to the crossbar 500. The notch 50 and foot 56 connection may be formed through a variety of shapes (flat, rectangular, or round). Examples of the accessory notch 50 being used for a base foot accessory to secure bike rack 520 that holds bicycle tire and a skewer accessory 522 that holds bicycle forks 524 are shown in FIGS. 2C and 2D, respectively. The skewer accessory could have a locking mechanism to prevent it from being opened when it is holding the bicycle forks. As explained below, the mount 30 may be a bracket 52 that is held within a cavity 46 in one of the jaws or other type of fastener which mates with and holds an accessory mount insert 58.

The entire assembly uses materials that are appropriate for use outdoors, such as plastics, rubber, and treated or stainless steel. Different types of locks 170, 514 can be used with the clamp 10 to prevent unwanted removal. For example, a padlock 514 that is separate from the clamp body can be used with locking tabs that extend from the jaws or from one or both of the handgrip and the trigger handle to keep the clamp in its closed configuration. Another type of lock fastener 170 can be integral to the clamp body and is actuated using a key or other security device.

The modular system described above allows a wide variety of roof rack accessories to be securely attached to a vehicle roof. These accessories may utilize the roof rack clamp 10 as the method of attachment, and other methods are also possible. Some accessories have a universal foot 56 that integrates with the accessory notch 50 in the clamp 10. However, the foot 56 is able to connect to other components that attach to roof rack crossbars 500. The accessory foot 56 can also contain an alternate connection point which allows it to connect different types of crossbar clamps. The alternate connection point in the accessory foot 56 may be a hole, a slot, or other appropriately sized space to accept the connection method between the crossbar clamp 10 and the accessory foot 56. FIG. 2E depicts the accessory foot 56 as it can secure a cargo carrier 510 to the crossbar 500. In one configuration, the accessory foot is connected to the cargo carrier directly. In another configuration, the cargo carrier could have an accessory mount that mates with a threaded bolt connector 114. The threaded bolt connector 114 has a base plate or other bracket 164 with a threaded bolt 166 that extends upward from the bracket. It will also be appreciated that a threaded bolt connector 114 can be attached directly to the upper surface of the upper jaw 12b.

For a roof box accessory 510, current products and patents contain integral clamps, usually four, which are accessed from within the roof box or below it at the crossbar. In this invention, as shown in FIG. 2E, the roof box 510 simply contains four feet 56 which extend out from both sides (two per side) and at each of two crossbars 500 (for a total of four). These feet 56 could be formed as integral parts of the molded plastic roof box 510 construction, or the feet 56 could be separate components that bolt onto the roof box during initial assembly. The roof box 510 is then secured to the crossbars 500 by one of a variety of methods such as threaded bolt connector 114 or using the roof rack clamp 10 described in this invention. Canoe or kayak accessories and other accessories can also use an accessory foot 56 that is inserted into the notch and secured to the crossbar 500.

Figure 3A:
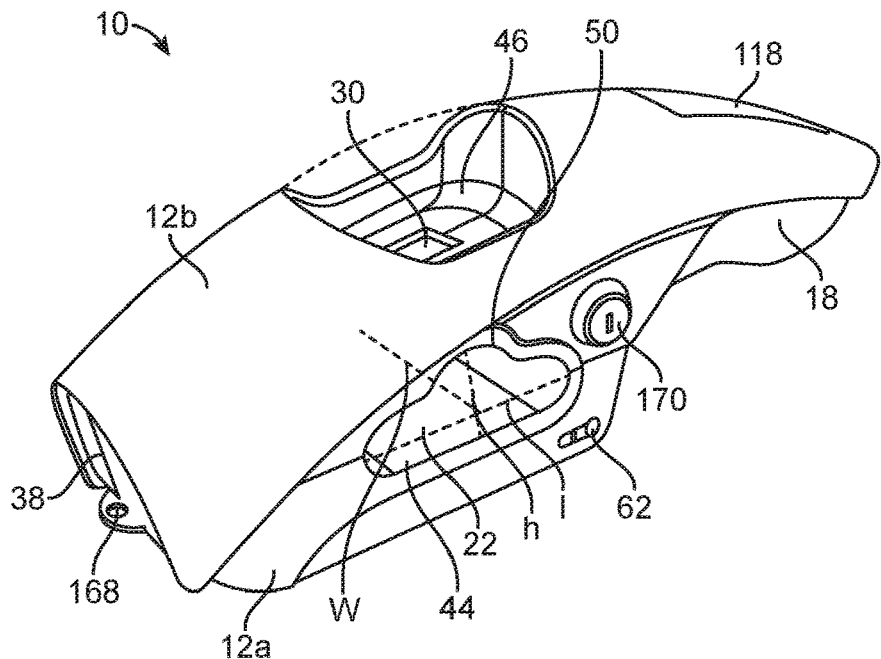
FIG. 3A is an isometric view of an alternative slide ratchet bar clamp with a latching mechanism.
Figure 3B:
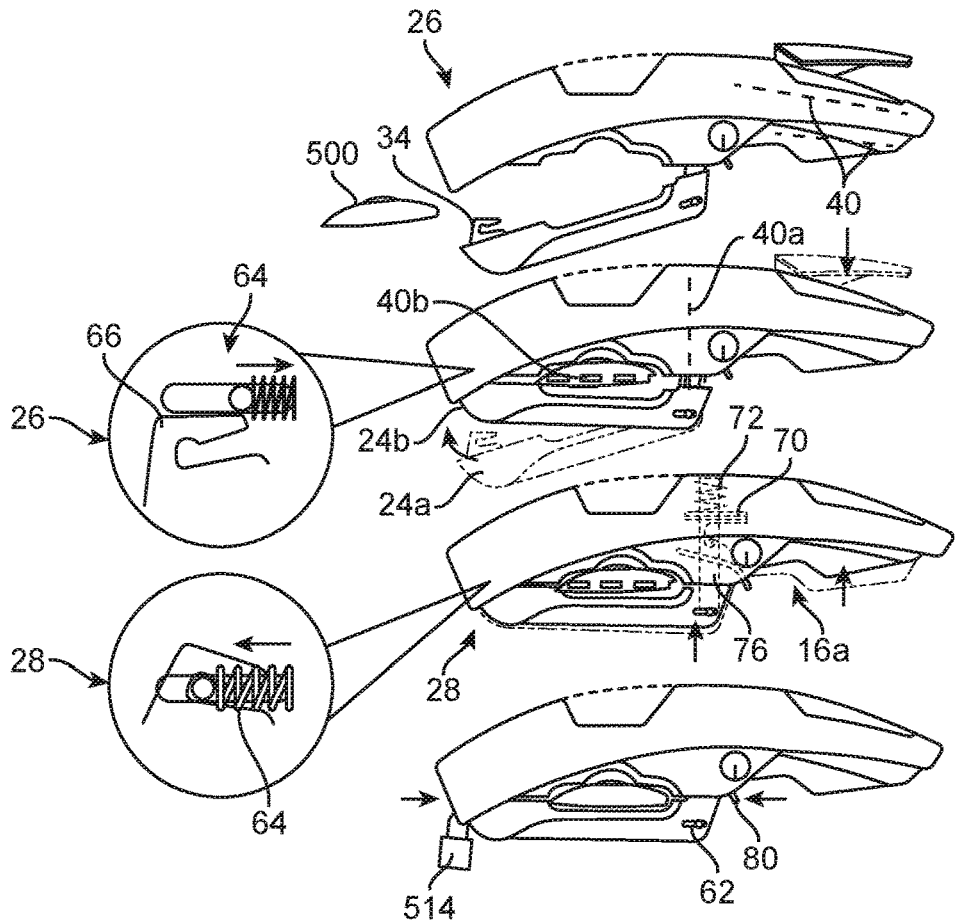
FIG. 3B shows the clamp of FIG. 3A in a progression of orientations between the jaws relative to the roof rack crossbar.

An alternative slide ratchet bar clamp with a latching mechanism is shown in FIGS. 3A-3D. This embodiment has many of the same features as the slide ratchet bar clamp shown in FIGS. 1A and 1B and described above. Rather than using a removable pin as the connection point between the pair of jaws, this embodiment of the invention uses a spring-loaded latch 64 that releasably engages with a catch 66 when the clamp 10 is in the closed configuration 28. FIG. 3B illustrates how the spring-loaded latch 64 and catch 66 disengage from each other to allow the jaws to separate and engage with each other to close the jaws 12 of the clamp 10. A lower jaw lever 118 can be pulled upwards to unlock the lower jaw and pushed downwards to lock the lower jaw. The distal end of the upper jaw has a latch release 38. When the latch release is depressed, it pushes the latch back to release the catch so that the distal end of the lower jaw rotates away from the distal end of the upper jaw, thereby producing an opening 34 for the pair of jaws to be placed around the crossbar. When the latch release is no longer depressed, the spring pushes the latch into the catch to lock the lower jaw to the upper jaw. The trigger handle is then operated relative to the handgrip similarly to the clamp as described in FIG. 1 to tighten and secure the clamp around the crossbar.

Since the distal ends of the jaws can be readily opened and closed with the releasable connection point 90a provided by the latching mechanism, the connection point 90b between the proximal end of the bottom jaw and the ratchet bar 76 can be a fixed pivot point 102 that is not detachable. In particular, the hinge 62 between the lower jaw and the ratchet bar can be a nondetachable hinged connection.

A locking fastener 170 can be used to prevent the breaking lever 80 from being actuated when the clamp is in its closed configuration. This will prevent the jaws of the clamp from moving into their opened configuration when the lock is engaged with the breaking lever to secure the clamp to the roof rack. The locking fastener 170 may also be used to lock a bracket 52 and an accessory mount insert 58 into the recess 50 on the topside of the top jaw. To further protect the closed clamp from being opened and removed from the roof rack, the distal ends of the pair of jaws may also have a respective pair of tabs 168 that can be locked. The pair of tabs can have holes for the shackle of a padlock 514.

The interior surfaces 32a of the jaws preferably have a resilient surface 44, such as silicon rubber. The resilient surface may be formed as inserts with different shapes to serve for crossbars that have different cross-sectional shapes. As with the embodiment described above with reference to FIGS. 1A-1C, the longitudinal axis 40a of the flat-sided bar is substantially perpendicular to the longitudinal axis 40b of the interior space, and the longitudinal axes 40 of the trigger handle and the handgrip are substantially aligned with the longitudinal axis 40b of the interior space. The external surfaces of one or both of the jaws may also have a resilient surface to help prevent scratching or scuffing of the vehicle's paint and preventing potential damage to the items being secured to the roof rack.

Figures 3C, 3D:
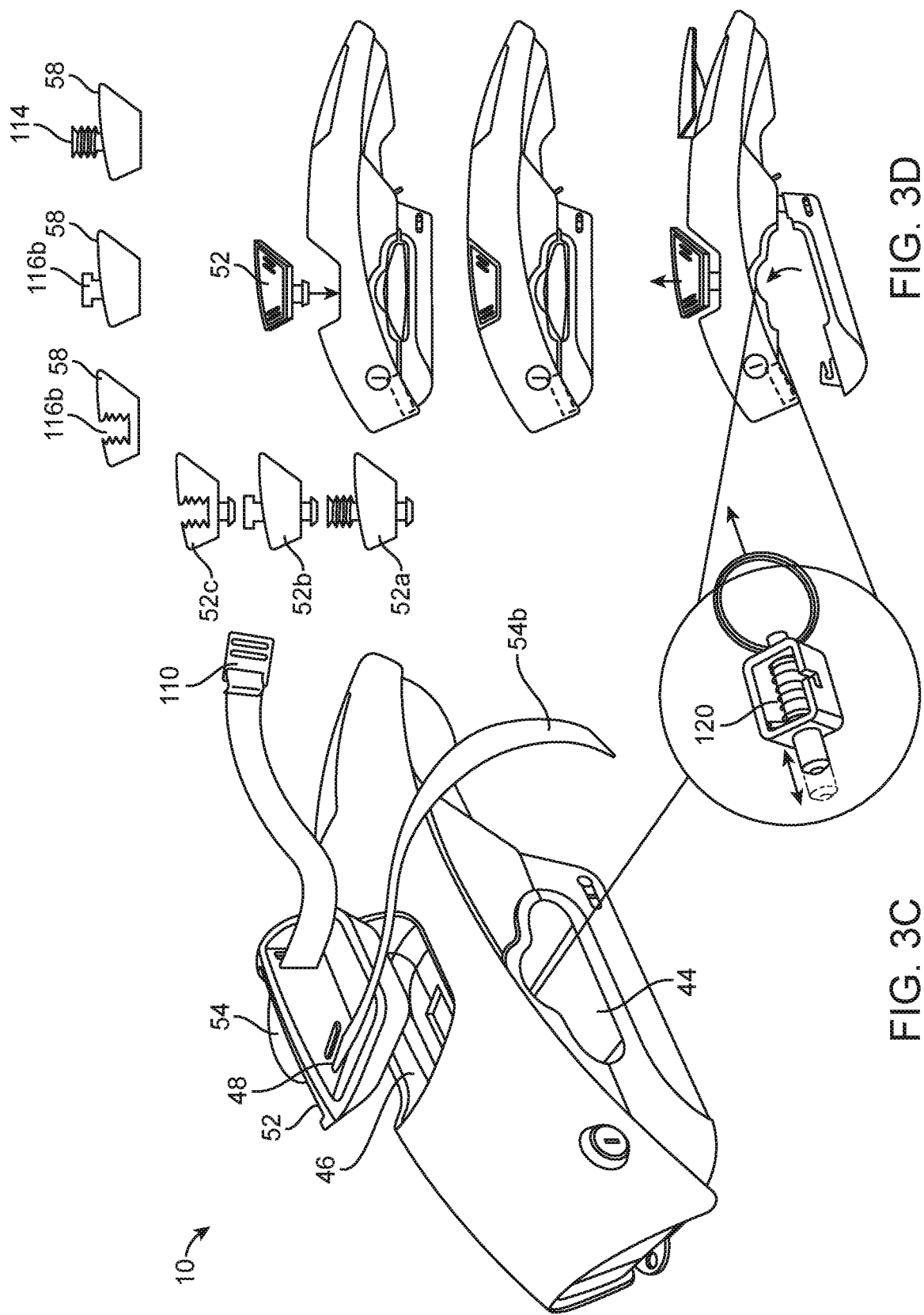
FIGS. 3C and 3D are an isometric view and side view, respectively, showing a modular mount and a progression of positions relative to the clamp of FIG. 3A.

FIGS. 3C and 3D show a mount 30 in the form of a depression or cavity 46 and a mating bracket 52 that can be used with straps 54 or with an accessory mount insert 58 or directly with an accessory mount. The bracket is preferably secured within the cavity 46 on the topside of the top jaw. In the particular embodiment shown in FIGS. 3C and 3D, the bracket fits within the cavity and has a protrusion with a flange on its end which extends through a hole in the bottom of the recess and engages a spring pin lock 120 where it clicks into place. The spring pin lock may be accessed from a port in the interior surface of the upper jaw. When the jaws 12 are in their closed configuration around the roof rack's crossbar, the spring pin 120 cannot be accessed on the underside, thereby locking the bracket 52 in place. As particularly shown in FIG. 3D, the distal end of a jaw can have a latch that connects with a catch in the distal end of the other jaw when the jaws are in their closed position. The latch and catch could include a keyed locking mechanism that prevents the latch from disengaging from the catch when the jaws are in their closed position without the proper key, thereby preventing the clamp from being opened when the jaws are locked.

The bracket can have one or more slots 48 through which one or more straps 54 pass through. The accessory mount insert 58 mates with and is held by the bracket and may be locked in place by the locking fastener. It will be appreciated that the bracket 52 and/or the accessory mount insert 58 can have different configurations, and various mating connections can be used between the bracket 52 and the jaws. Examples of various inserts include locking threaded connectors 114, male/female connectors 116a, and threaded holes 116b, and it will be appreciated that other fasteners and mating features could be used for the inserts or the brackets 52a, 52b, 52c could be formed with these different types of mating features including integrally threaded connectors. Accordingly, the modular bracket mount of the present invention can be used with different types of accessory mounting systems from a number of different manufacturers.

Figure 4B:
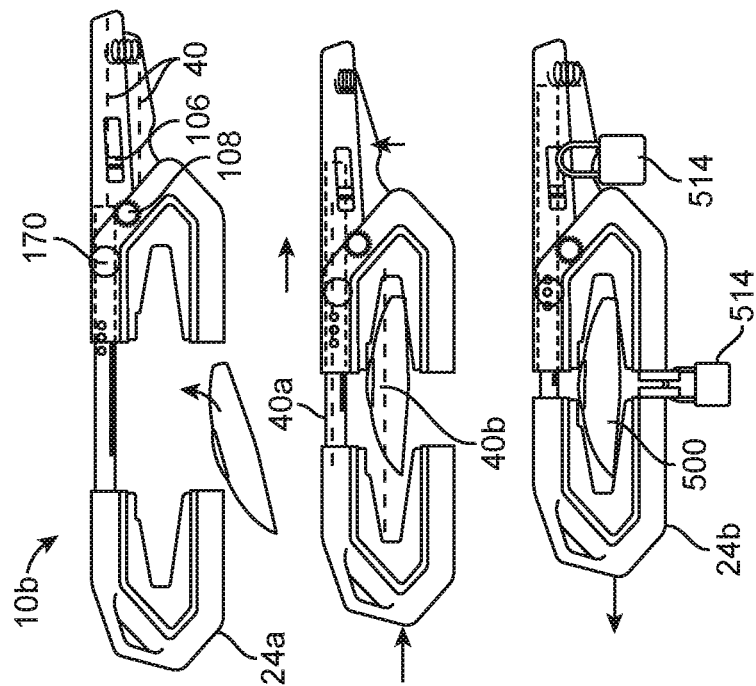
FIG. 4B shows clamp of FIG. 4A in a progression of orientations between the jaws relative to the roof rack crossbar.
Figure 4A:
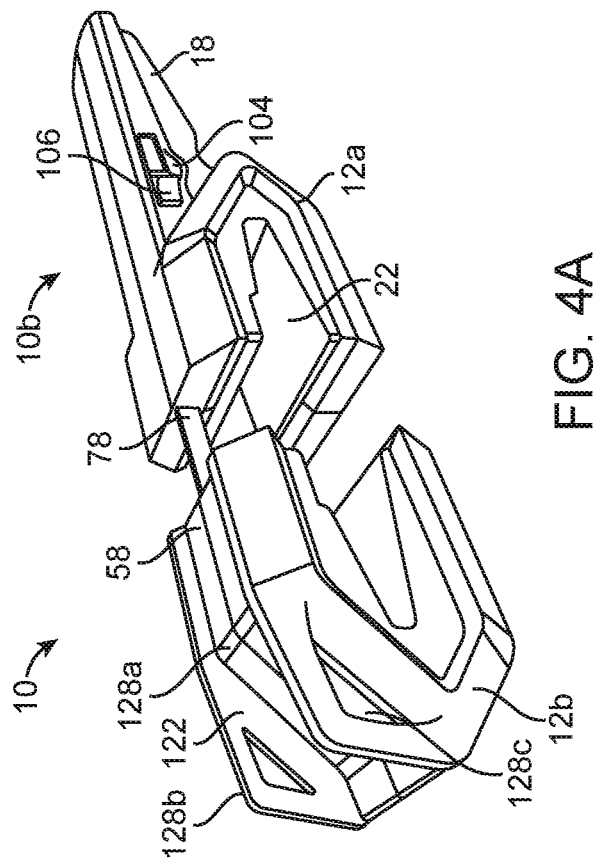
FIG. 4A is an isometric view of an alternative slide ratchet bar clamp.
Figure 4C:
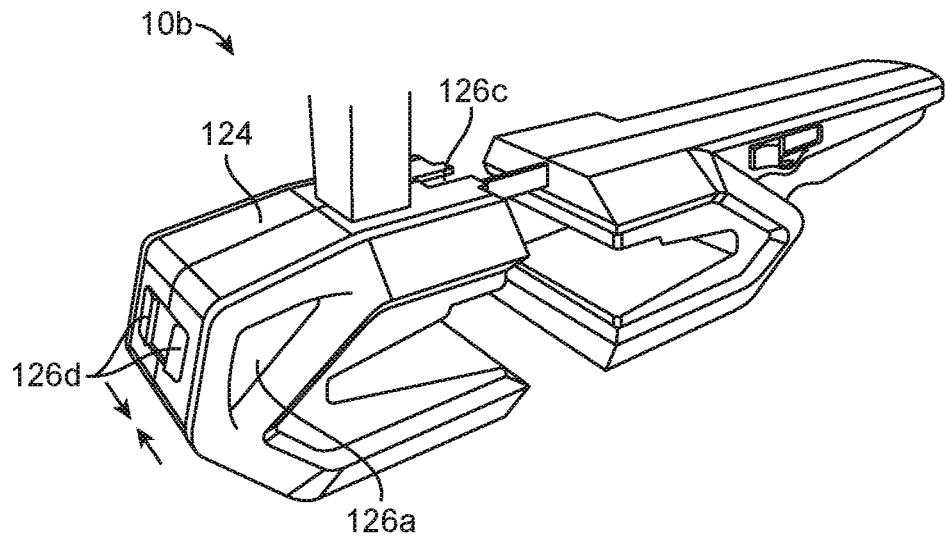
FIGS. 4C and 4D are an isometric view and side view, respectively, showing an accessory mount in a progression of positions relative to the clamp of FIG. 4A.
Figure 4D:
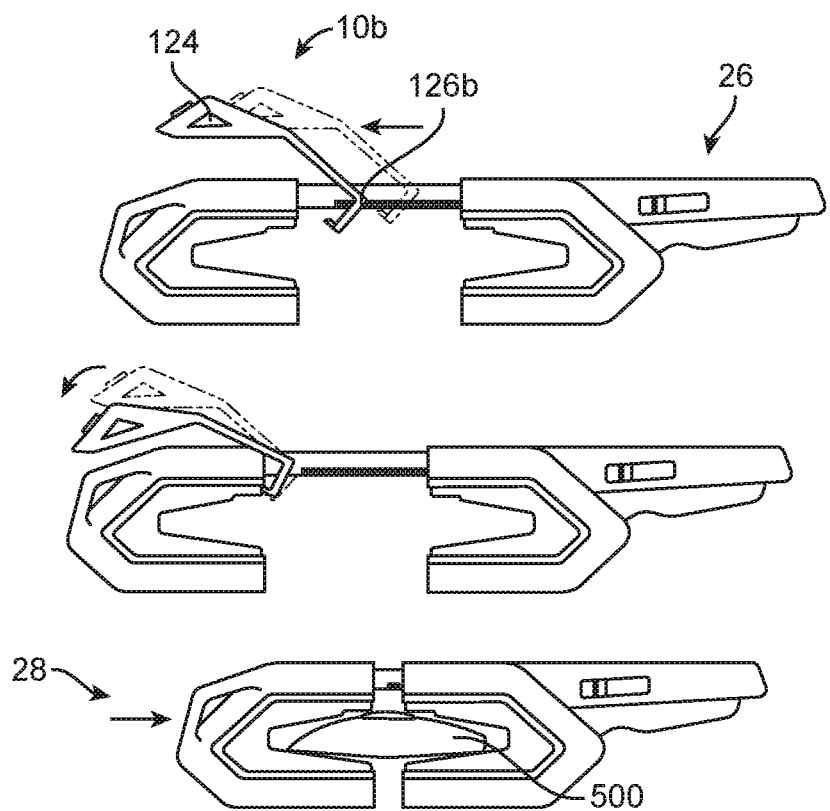
Figure 5A:
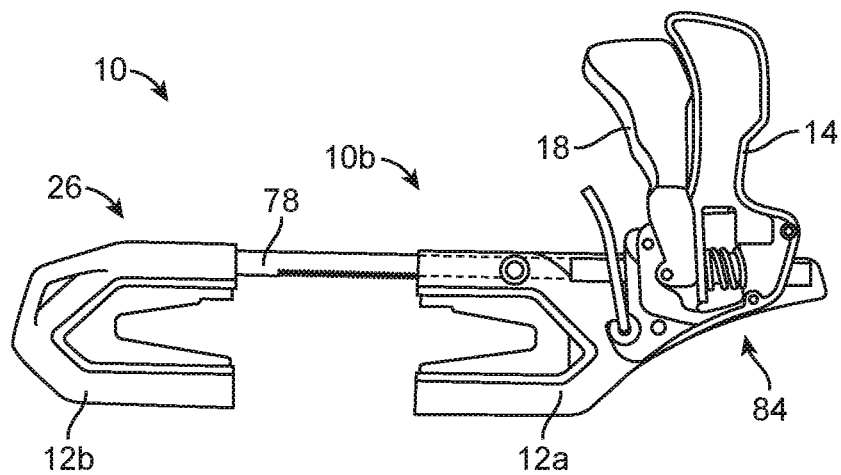
FIGS. 5A and 5B are side views of another alternative slide ratchet bar clamp.
Figure 5B:
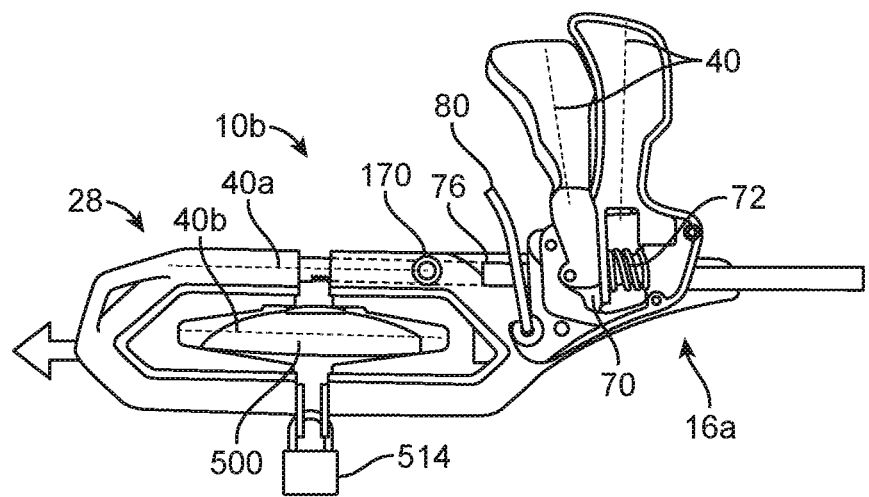

The horizontal bar clamp, as shown in FIGS. 4A and 4B and in FIGS. 5A and 5B, has similar components as the vertical bar clamp 10a. However, rather than having top and bottom jaws, the horizontal bar clamp 10b has a front jaw 12b and a back jaw 12a. The back clamp 12a part has a ratcheting mechanism 86 that allows a connecting member 68 to move in the horizontal direction when a lever handle 18 is depressed. As the lever handle is depressed 18, a driver bar or a ratcheting pawl engages the connecting member 68 and forces it in the horizontal direction thus closing the clamp 10. The ratcheting mechanism 86 and the connecting member 68 facilitate the front 12b and back clamp 12a parts to compress together against the sides of the crossbar 500 becoming tighter with each squeeze of the lever handle 18, thus holding the clamp 10 securely in place on a vehicle roof rack 500. The ratcheting mechanism 86 may use friction or gear teeth or other method of operation.

The clamp has a mount 30 on the front clamp 12b part in the form of an accessory attachment bracket 122, allowing the clamp 10 to securely hold roof rack accessories. Accessories such as roof boxes and other cargo bins 510, bike racks 520, kayak/canoe holders, etc, have a corresponding connector piece 124 which attach to the bracket. The accessory attachment bracket 122 has a recess 128a and a pair of side arms 128b that each surround attachment holes 128c. The accessory connector 124 has a pair of side clips 126a at one end that respectively snap into the attachment holes and has a hook 126b at the other end with a channel 126c in the hook that is situated around the connecting member 68. FIG. 4B shows the progression of how the accessory attachment 122 is secured to the front clamp 12b. The connector piece 124 fits onto the front clamp 12b part so that once the clamp 10 is secured to the crossbar 500, the clamp holds the accessory securely to the crossbar 500. The connector piece 124 hooks onto the front clamp 12b part and is rotated downward to snap into place using side clips 126a that engage with the clamp body 10. The connector piece 124 is released from the accessory attachment bracket 122 by inwardly depressing the side clips 126c directly or disengagement tabs 126d that are connected to the side clips. It will be appreciated that a similar accessory adapter with side clips could be used with the clamp embodiment shown in FIGS. 1A and 1B with the side clips being releasably secured within the slots 48 and the body of the adapter fitting between the sidewalls of the top jaw.

The clamp 10 can be locked by means of inserting the shackle of a padlock 514 in the lock hole 104. Preferably, the lock hole 104 is located at the release lever 106 so that the padlock prevents the release lever from moving. Alternatively, the end of the slide bar may have a hole that aligns with a locking fastener when the clamp is in its closed configuration so that the locking fastener can engage the hole to prevent any movement of the slide bar back to the opened configuration. Alternatively or in combination with the padlock or the locking fastener, a pair of tabs with center holes could extend from the corresponding pair of jaws, and the shackle of the padlock can be placed through the center holes. It will also be appreciated that the latching mechanism shown in FIGS. 3A and 3B and described in detail above could also be incorporated into the jaws of the clamps shown in FIGS. 4A-4D and FIGS. 5A and 5B; in particular, the latch would be situated on one of the jaws opposite from the slide bar and the catch would be situated on the other one of the jaws also opposite from the slide bar.

Similar to the clamps shown in FIGS. 1A-1C and in FIGS. 3A-3D, the slide connector 68 may be a flat-sided slide bar 76 or a toothed slide bar 78. Also similar to the embodiments described above, the trigger handle pivotably mounts to the fixed jaw and the actuator includes a clamp release 106 and a compression coil spring situated between the trigger handle and the handgrip to bias the trigger handle away from the handgrip. However, unlike the embodiments described above, the horizontal slide clamp shown in FIGS. 4A-4D can position the handle spring with its axis perpendicular to the longitudinal axis of the slide bar rather than having aligned axes so the spring would not surround the slide bar. In this embodiment, the clamp release 106 is connected either to the ratchet's one-way driver mechanism 108 or to a ratchet locking pin (not shown) that would be similar to the pin described below for the fulcrum ratchet clamp. The clamp release can be operated to disengage the one-way driver mechanism 108 from the slide ratchet 78 or to disengage the ratchet locking pin. The slide connector 68 extends between the fixed jaw 12a and the movable jaw 12b and connects the pair of jaws 12.

In the embodiment shown in FIGS. 4A-4D, the longitudinal axis 40a of the slide ratchet is substantially parallel to the longitudinal axis 40b of the interior space so that both of these axes are substantially aligned with the longitudinal axes 40 of the trigger handle and the handgrip. In the embodiment shown in FIGS. 5A and 5B, the longitudinal axis 40a of the slide ratchet is substantially parallel to the longitudinal axis 40b of the interior space, and these axes are substantially perpendicular to the longitudinal axes 40 of the trigger handle and the handgrip.

Figure 6A:
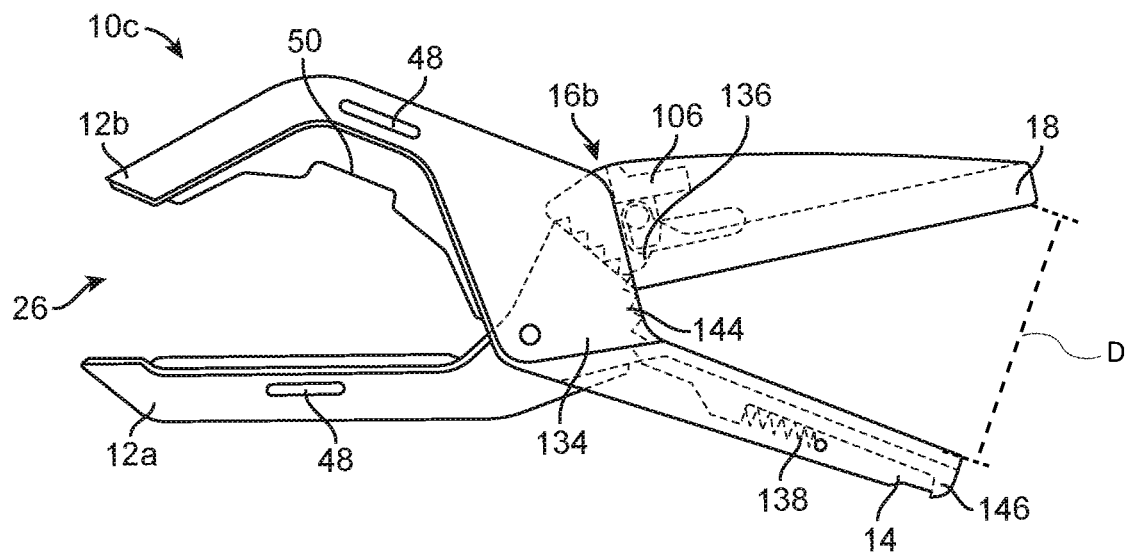
FIGS. 6A and 6B are side views of a fulcrum ratchet clamp according to the present invention in an opened configuration and a closed configuration, respectively.
Figure 6B:
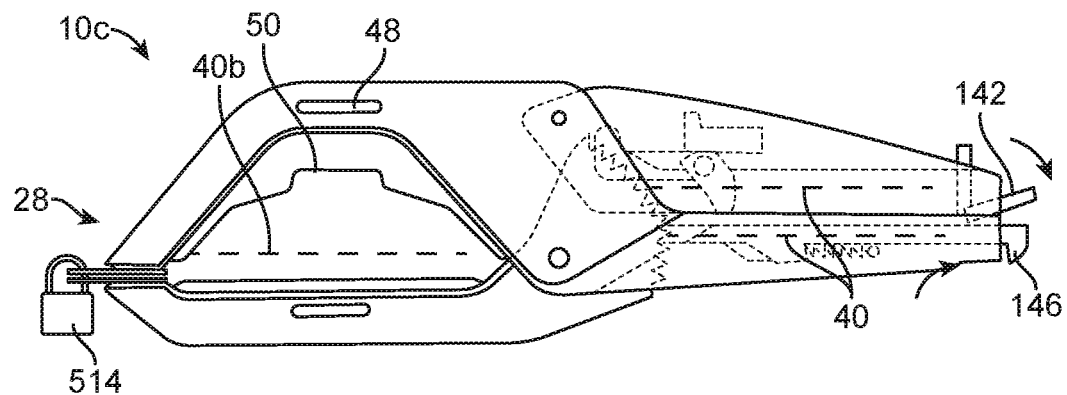

FIGS. 6A and 6B show the fulcrum ratchet clamp 10c that has a many of the same basic components as the other ratchet clamp embodiments described above. In particular, the clamp 10 has a pair of jaws 12, a handgrip 14, a trigger handle 18, and an actuator 16. In this embodiment the actuator is a ratcheting mechanism 16b with gear teeth along a curve 144 rather than having teeth on a straight bar. The lower jaw 12a contains the ratchet gear 134, and the trigger handle 18 contains the pawl 136 with a handle spring. As the trigger handle is rotated toward the lower handle by squeezing it, the pawl engages the gear teeth and rotation causes the lower jaw 12a to close. As the ratchet gear rotates around its pivot point to close the lower jaw, a spring-loaded ratchet locking pin 146 engages the gear teeth as they pass by in the closing direction. When the ratchet locking pin is engaged with the gear teeth, it prevents the ratchet gear from rotating in the opening direction. The ratchet locking pin has a tab that can be pulled back to pull the ratchet locking pin away from the teeth and which allows the jaws to move into the opened configuration.

In the closing action, with the locking pin engaging the gear teeth, when trigger handle is released, the internal handle spring forces it away from the handgrip, and the pawl resets. This motion is repeated until the lower jaw 12a and upper jaw 12b are tightly closed onto the roof rack crossbar 500. Since the ratchet locking pin holds the ratchet gear and the jaws in the closed configuration, the pawl and handle spring assembly can be released from the ratchet gear using a thumb slider 106 which allows the trigger handle to be closed against the handgrip. A retainer clip 142 attached to the handgrip can be rotated into engagement with the trigger handle to hold it in its closed position adjacent to the handgrip.

Similar to the embodiments described above, the clamp has a slot 48 and an accessory notch 50 in the upper jaw 12b, allowing the clamp 10 to securely hold roof rack accessories. The notch 50 and foot 56 fit together so that once the clamp 10 is secured to the cross bar 500 the clamp 10 holds the accessory securely to the cross bar 500. The notch 50 and foot 56 connection may be formed through a variety of shapes (flat, rectangular, or round). The clamp can be locked by means of inserting the shackle of a padlock 514 in lock holes in a pair of tabs that extend from the distal ends of the jaws. It will also be appreciated that the latching mechanism shown in FIGS. 3A and 3B and described in detail above could also be incorporated into the jaws of the clamps shown in FIGS. 6A and 6B; in particular, the latch and catch would be situated at the distal ends of the jaws opposite from the actuator.

Figure 7A:
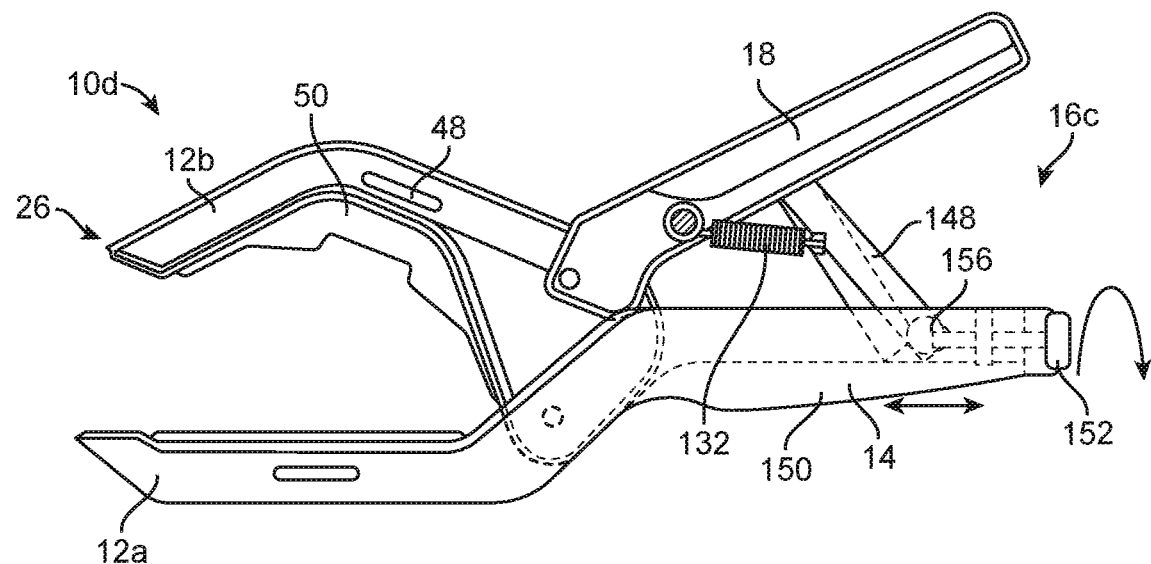
FIGS. 7A and 7B are side views of a vice grip lever clamp according to the present invention in an opened configuration and a closed configuration, respectively.
Figure 7B:
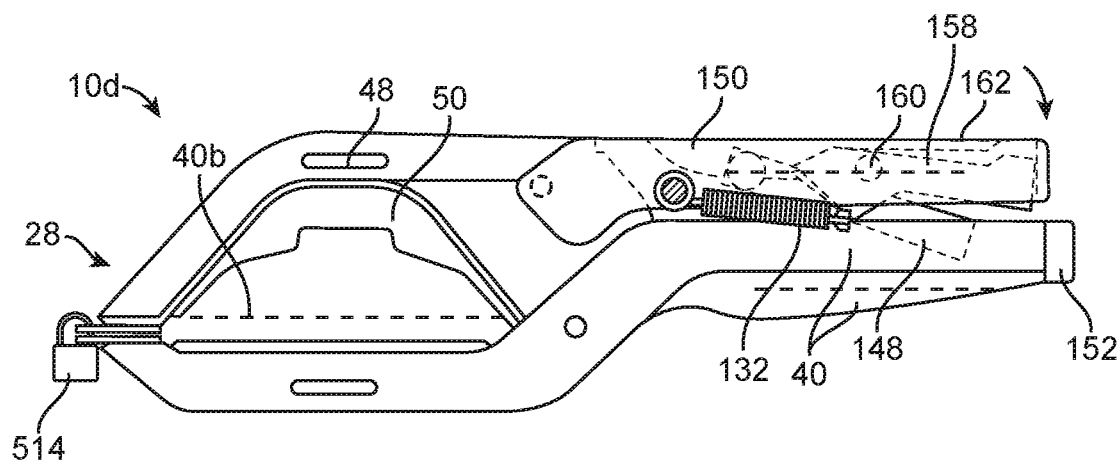

As shown in FIGS. 7 and 8, the locking lever clamp 10d operates in a similar manner as locking pliers, often called vice-grip pliers and wrenches. Similar to the ratchet clamp embodiments described above, the clamp 10 has a pair of jaws 12, a handgrip 14, a trigger handle 18, and an actuator 16. In this embodiment the actuator is a lever actuator 16c as compared to the ratchet actuators 16a, 16b described above. The trigger handle is rotated away from the handgrip when the jaws are in their opened configuration. As the trigger handle is rotated toward the handgrip, a linkage 148 between the handgrip and the trigger handle forces the jaw connected to the trigger handle to rotate toward the jaw fixedly connected to the handgrip until it reaches the closed configuration. The linkage 148 is positioned within recesses 150 in the handgrip and the trigger handle, and a tension coil spring 132 is connected between the linkage and the trigger handle as shown the lever clamp in FIGS. 7A and 7B. The tension spring biases the trigger handle away from the handgrip and is extended in the closed configuration and contracted in the opened orientation. An adjustment knob 152 at the back of the handgrip adjusts the longitudinal distance of the distal end of the linkage from the back end of the handgrip which varies the extent to which the movable jaw closes relative to the fixed jaw. Accordingly, the adjustment knob can be rotated so that when the clamp is in its closed configuration, the clamp tightly fits on the cross bar. In an alternative lever clamp shown in FIG. 8 the tension coil spring may be connected between the trigger handle and the handgrip through holes 172 in the handgrip and the jaw, as shown in FIGS. 8A, 8B and 8C. Additionally, the tension spring may be positioned on either side of the clamp and in such an embodiment a pin 174 translating though a slot 176 in the handgrip serves as a bearing surface 156 engaged by the threaded screw portion 178 of the adjustment knob as shown in FIGS. 8A, 8B 8D, and 8F.

Both lever clamp embodiments include a release lever 158 situated at the distal end of the trigger handle in the recess which rotates around a pivot point 160. In the closed configuration, the linkage pushes the proximal end of the release lever upward further into the interior portion 162 of the recess and the distal end of the release lever rotates away from the interior portion of the recess. When the distal end of the release lever shown in FIG. 7 is pushed into the interior portion of the recess, the proximal end of the release lever is forced away from the interior portion and pushes the linkage away from its locked position and the spring forces the linkage to rotate the trigger handle away from the handgrip, thereby rotating the jaws apart into the opened configuration. Alternatively, when the distal end of the release lever shown in FIG. 8 is pushed away from handgrip 14 the proximal end of the release lever pushes on the linkage forcing the trigger handle away from the locked position. Accordingly, the spring forces the linkage to rotate the trigger handle away from the handgrip and the jaws rotate into the opened configuration as described above.

Similar to the ratchet clamp embodiments described above, locking lever clamp embodiments have a slot 48 and an accessory notch 50 in the upper jaw 12b, allowing the clamp 10 to securely hold roof rack accessories. The notch 50 and foot 56 fit together so that once the clamp 10 is secured to the cross bar 500 the clamp 10 holds the accessory securely to the cross bar 500. The notch 50 and foot 56 connection may be formed through a variety of shapes (flat, rectangular, or round). As shown in FIG. 7B a variation of the lever clamp can be locked by means of inserting the shackle of a padlock 514 in lock holes in a pair of tabs that extend from the distal ends of the jaws. It will also be appreciated that the latching mechanism shown in FIGS. 3A and 3B and described in detail above could also be incorporated into the jaws of the clamps shown in FIGS. 7A and 7B with the latch and catch being situated at the distal ends of the jaws opposite from the actuator. An alternative lever clamp, such as in FIG. 8, may also have a threaded hole in the top outside surface of the upper jaw 12b for the attachment of a variety of threaded hooks, eyelets, and other fasteners. Additionally, rubberized or similar material can be attached to the fixed jaw, the trigger handle and handgrip for increased purchase and increased user comfort.

Figure 8A:
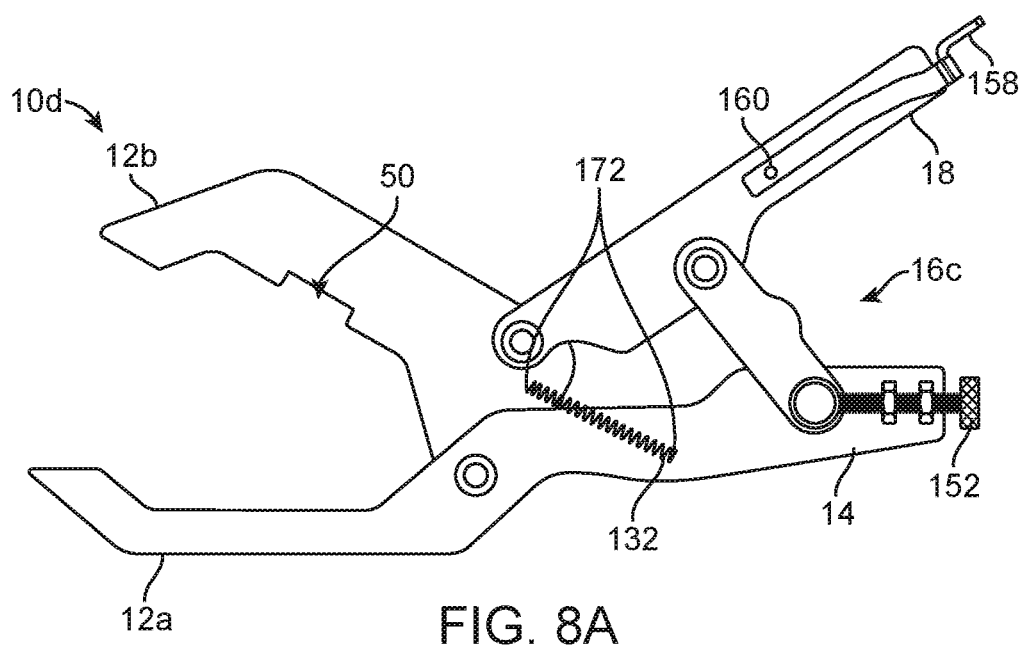
FIGS. 8A-8F depict an alternative vice grip lever clamp according to the present invention.
Figure 8B:
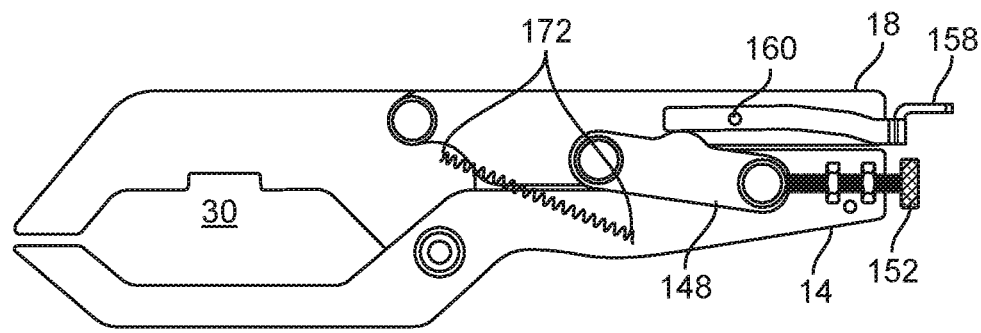
Figure 8C:
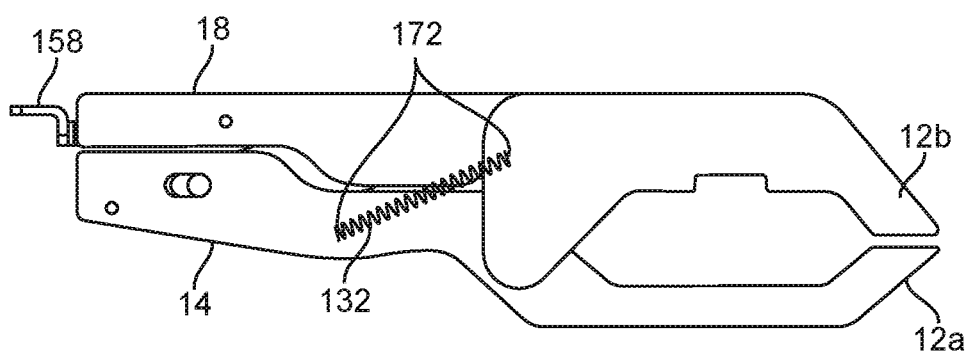
Figure 8D:
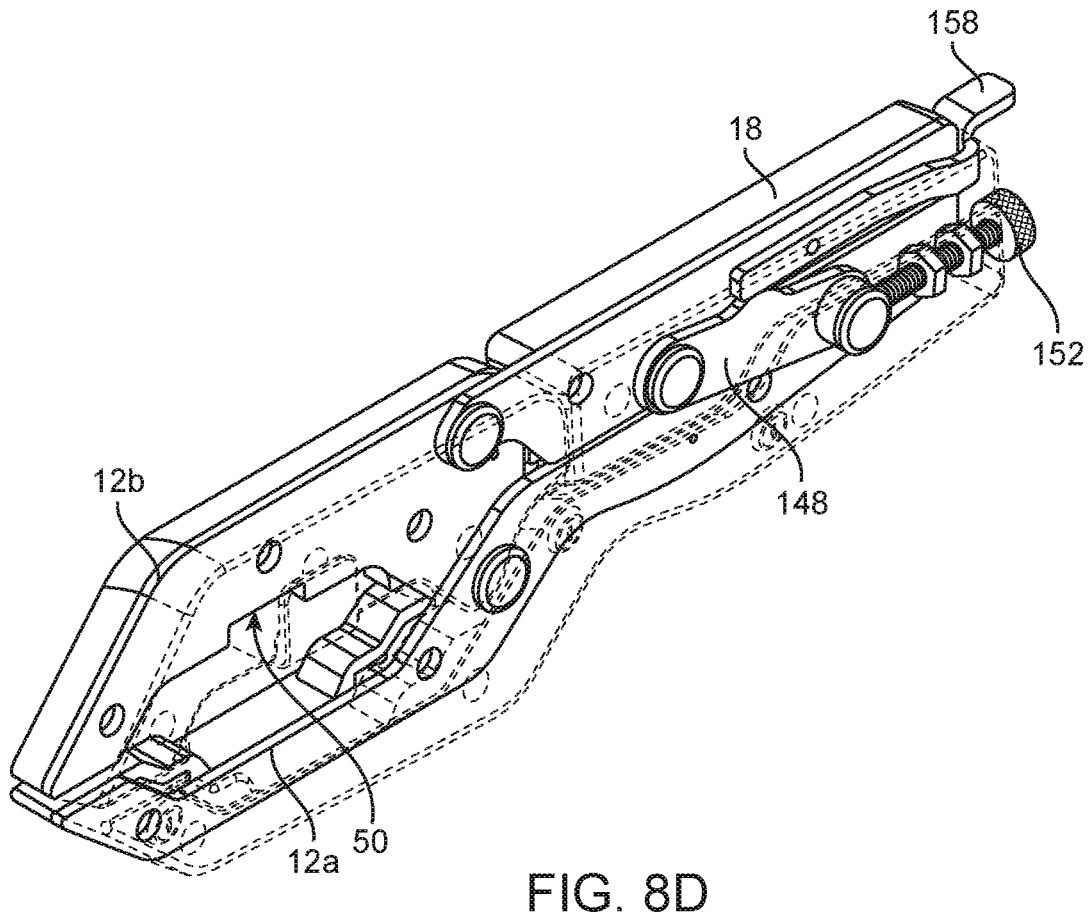
Figure 8E:
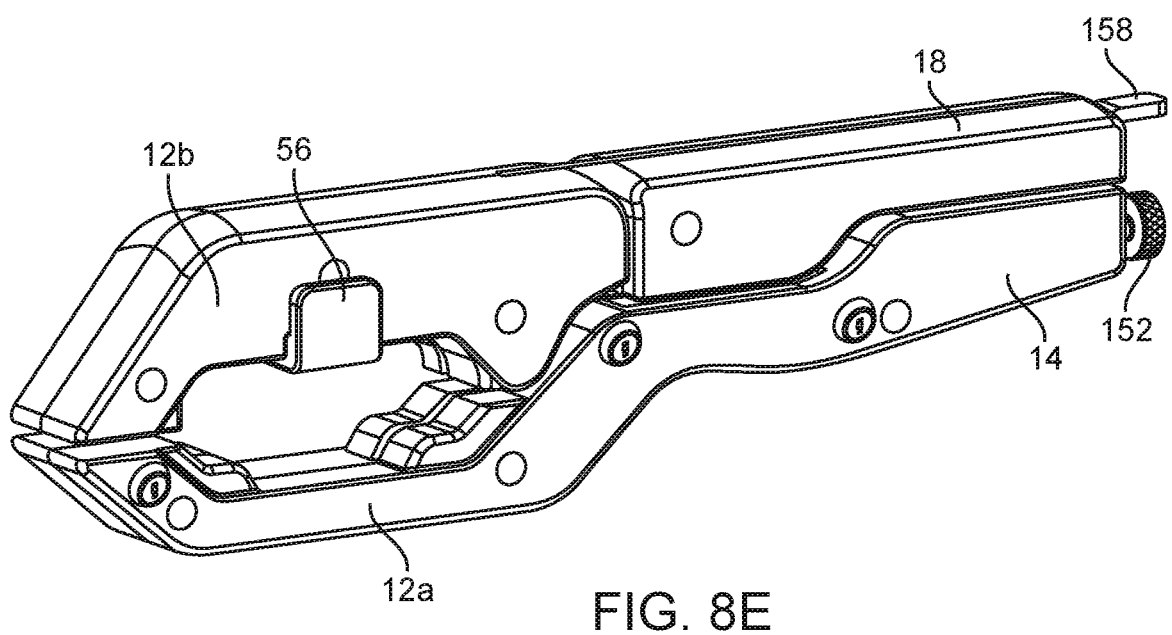

As described above, the clamp can be locked by means of inserting a cable lock or the shackle of a padlock 514 in lock holes in a pair of tabs that extend from the distal ends of the handgrip and trigger or may be locked by other types of lock mechanisms inserted into the side of the handgrip that can be can be situated in a number of different locations as shown in FIG. 8E. For example, a lock mechanism can be positioned in the handgrip adjacent to the release lever and can prevent the release lever from actuating the linkage to open the jaws when the lock is engaged and the clamp is in its closed configuration, such as with the lock described above with reference to FIGS. 3A and 3B that prevents the breaking lever from being actuated. Alternatively, a lock mechanism can be positioned toward the distal end of one of the jaws, such as with a latch and catch similar to FIGS. 3C and 3D. As yet another example, a lock mechanism for a latch and catch type of coupling could be situated between the handgrip and the trigger handle such that when the lock is engaged, the latch rotates out across the space between the handgrip and the trigger handle to engage the catch or the latch can be prevented from disengaging from the catch such as described above with references to FIGS. 3A and 3B.

Figure 8F:
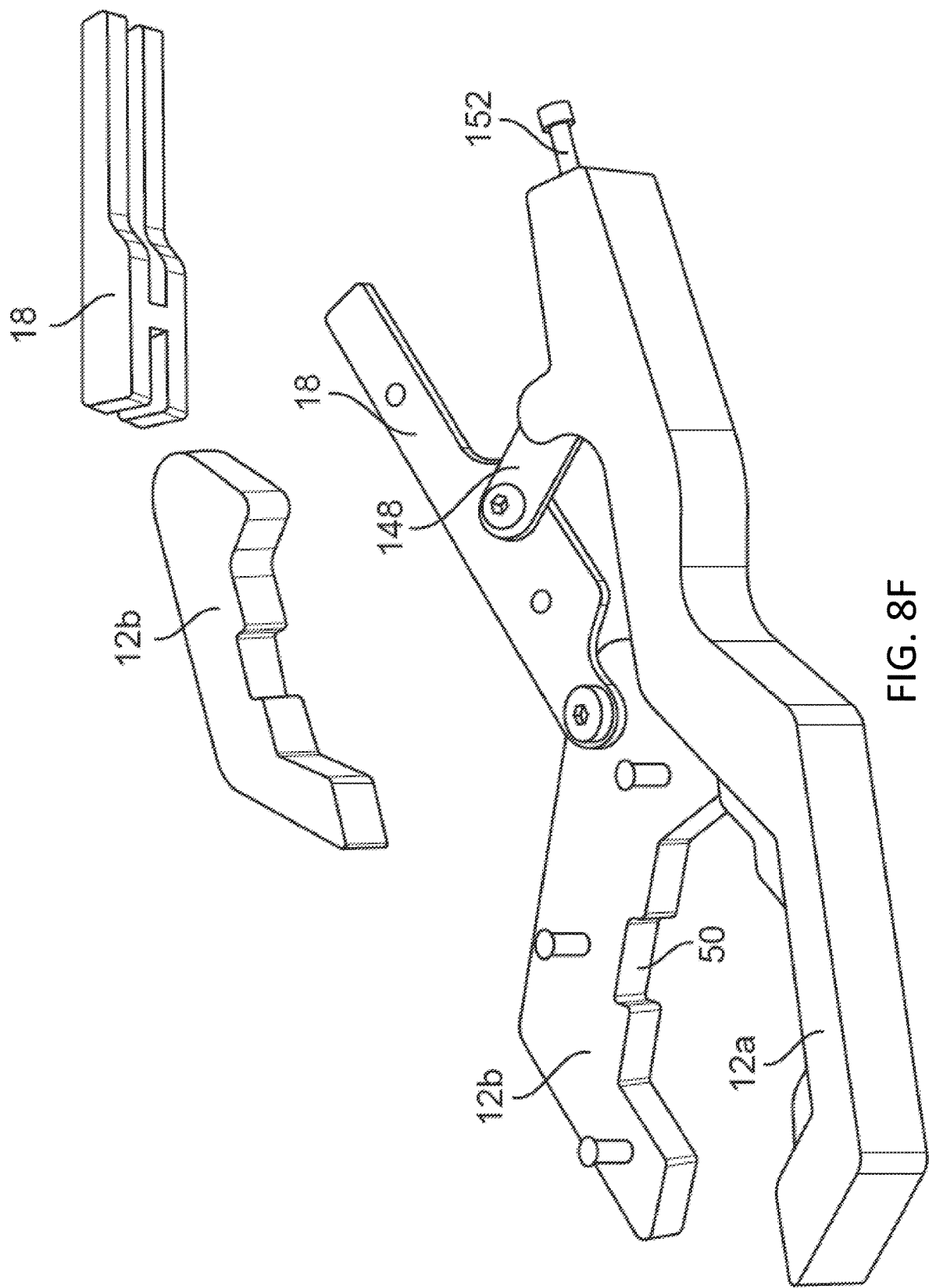

As particularly shown in FIGS. 8A-8F, the clamp described herein may also be made up of a separable frame and body. As shown in FIG. 8F the clamp has an internal metal frame with plastic body pieces attached thereto, but it will be appreciated by those having skill in the art that various frame and body materials may be also used. Additionally, as discussed above the body pieces are generally covered with a rubber material to provide an ergonomic handle grip as well as increased purchase within the jaws of the clamp. Additionally, the body pieces may be secured to the frame with various fasteners including but not limited to screws, bolts, pins and adhesives.

As indicated above, different types of clamp actuators 16 can be used in the present invention. The actuator mechanisms 16 that are used in slide ratchet clamps, fulcrum ratchet clamps, and vice grip locking pliers and other similar tools which hold workpieces in place can be incorporated into the clamp actuator 16 of the present invention. Examples of such actuator mechanisms are described in the following patents which are incorporated by reference herein: U.S. Pat. Nos. 952,079, 1,036,093, 2,514,130, 3,354,759, 3,427,016, 4,220,322, 4,926,722, 5,005,449, 6,000,686, 6,240,815, 7,784,774, and 8,177,203. Although the clamping and ratcheting mechanisms for these known hand tools can be incorporated into the roof rack clamp 10 of the present invention, these known tools as they currently exist would not satisfactorily serve as a roof rack clamp according to several features and aspects of the present invention as it is used for roof rack crossbars on vehicles or on other types of cargo carriers. The existing tools would not satisfactorily perform the clamping functions on the crossbars of vehicle roof racks 500 because they do not have a mount feature that is important to the operation of the roof rack clamp 10. The hand tools only have one connection point at the proximal end of the jaws, adjacent to the handgrip and trigger handle; they do not have a second connection point at the distal end of the jaws as in the preferred embodiments of the present invention to provide for additional clamping strength and security. Additionally, the hand tools do not have any type of locking fastener, locking tabs or other means for locking the clamps to prevent theft of the object being held to the roof rack. Further, the orientations and relative sizes of the clamping surfaces for the jaws that would provide sufficient stability for a secure connection to crossbars. For example, many of the hand tools have a width that is too narrow relative to the length and height of the interior space between the jaws so they would likely rock or rotate if placed on a crossbar.

Additionally, if known hand tool clamps were to be modified according to the teachings of the present invention, they would no longer satisfactorily perform the clamping functions necessary to hold workpieces that they are designed to hold in place because they require a different orientation of the jaws with a relatively smaller surface area for the workpieces. According to the teachings for hand tool clamps, when the pressure of one or both jaws is to be distributed on a particular type of workpiece, a clamping caul is typically placed between the jaw and the workpiece rather than modifying the design of the clamp. Therefore, although the general teaching of these clamping and ratcheting mechanisms of these tools are incorporated by reference herein, modifications of these mechanisms must be made according to the present invention to satisfactorily perform the necessary clamping function in a roof rack clamp.

The present invention has a number of benefits over current roof rack clamps and other cargo carrier clamps. Although there are many known clamps that have a pair of adjustable jaws that connect a particular type of accessory mount or a universal accessory mount to the crossbar of a roof rack, none of the prior art clamps use both a handgrip and a trigger handle that allows for single-handed installation of the clamp on the roof rack's crossbar. Additionally, none of the of prior art references combine a handgrip and a trigger handle with an actuator that provide a mechanical advantage of the lever action of the trigger handle. Other benefits of the present invention include the handle spring situated between the handgrip and the trigger handle which allows for single-handed tightening of the jaws on the crossbar and the quick clamp release of the present invention which permits for the efficient repositioning of the clamp on the crossbar.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A clamp for connecting to a roof rack bar, comprising:
   a pair of jaws comprised of a fixed jaw, a movable jaw opposing the fixed jaw, and an interior space between the fixed jaw and the movable jaw, wherein the movable jaw has a spaced apart position relative to the fixed jaw and a proximate position relative to the fixed jaw, wherein the pair of jaws has an opened configuration when the movable jaw is in the spaced apart position and a closed configuration when the moveable jaw is in the proximate position, wherein each one of the jaws is comprised of an interior surface bounding opposite sides of the interior space, wherin the interior surface of one of the locking jaws is compromised of a planar cross-section, wherein the interior surface of the other of the locking jaws comprises a single notch, wherein the interior space has a width, a length and a maximum height when the pair of jaws are in the closed configuration, wherein the width is at least approximately equal to the maximum height in the closed configuration, and wherein at least one of the length and the maximum height is increased and forms an opening to the interior space between the pair of jaws when in the opened configuration;
   an elongated handgrip fixedly connected to the fixed jaw proximate to a first side of the fixed jaw, and wherein the elongated handgrip extends away from the first side of the fixed jaw along a first longitudinal axis;
   an actuator operatively connected to the elongated handgrip proximate to the first side of the fixed jaw, wherein the actuator connects the pair of jaws to each other, wherein the actuator moves the pair of jaws between the opened configuration and the closed configuration, and wherein the elongated handgrip extends outwardly away from the actuator;
   a trigger handle extending away from the first side of the fixed jaw along a second longitudinal axis in the same direction as the first longitudinal axis of the elongated handgrip when the pair of jaws are in the opened configuration and when the pair of jaws are in the closed configuration, wherein the second longitudinal axis of the trigger handle is aligned with the first longitudinal axis of the elongated handle within an acute angle when the pair of jaws are in the opened configuration and when the pair of jaws are in the closed configuration, wherein the trigger handle is pivotally mounted to at least one of the fixed jaw and the movable jaw, and wherein the trigger handle is operatively connected to the actuator; and
   a lock attached to at least one of the fixed jaw, the movable jaw, the elongated handgrip, and the trigger handle, wherein the lock has a locked configuration preventing the pair of jaws from moving from the closed configuration to the opened configuration and has an unlocked configuration permitting movement of the pair of jaws from the closed configuration to the opened configuration.

2. The clamp of claim 1, further comprising a handle spring and a clamp release, wherein the handle spring is connected at a first end to at least one of the trigger handle and the elongated handgrip, and wherein the clamp release is selected from the group of release devices consisting of a braking lever, a thumb slider, a ratchet locking pin, and a release lever.

3. The clamp of claim 1, further comprising a mount connected to or formed as a part of at least one of the pair of jaws.

4. The clamp of claim 3, wherein the mount is further comprised of at least one of a slot extending through at least one of the fixed jaw and the moveable jaw, the notch in the interior surface in one of the fixed jaw and the moveable jaw, and a bracket connected to at least one of the fixed jaw and the moveable jaw, wherein the actuator is comprised of a locking lever linkage connecting the trigger handle to the elongated handgrip, wherein the handle spring is connected at a second end to at least one of the locking lever linkage and the movable jaw when the first end is connected to the trigger handle and the elongated handgrip, respectively, and wherein the single notch comprises another planar cross-section.

5. The clamp of claim 1, wherein the elongated handgrip has a span that is the same order of magnitude as the length of the interior space in the closed configuration, wherein the trigger handle has a length at least half as long as the span of the elongated handgrip, wherein proximal ends of the elongated handgrip and the trigger handle adjacent to the actuator are spaced by a distance that is less than the span of the trigger handle, wherein the roof rack bar fits through the opening in the opened configuration, and wherein the roof rack bar is contacted by the interior surface of the pair of jaws when in the closed configuration.

6. The clamp of claim 1, wherein the acute angle between the first longitudinal axis and the second longitudinal axis is less than 45° when the pair of jaws are in the opened configuration and when the pair of jaws are in the closed configuration.

7. The clamp of claim 1, wherein the trigger handle rotates relative to the elongated handgrip between a first position and a second position within the acute angle when the pair of jaws are in the opened configuration and in the closed configuration.

8. The clamp of claim 1, further comprising an adjustment knob situated at a back end of the elongated handgrip opposite from the fixed jaw, wherein the actuator further comprises a locking lever linkage connecting the trigger handle to the elongated handgrip, wherein the adjustment knob engages a bearing surface at a distal end of the locking lever linkage which is connected to the elongated handgrip, and wherein a movement of the adjustment knob causes a longitudinal distance of the distal end to move relative to the back end and varies the distance between the movable jaw and the fixed jaw in the closed configuration.

9. A clamp for connecting to a roof rack bar, comprising:
   a pair of jaws comprised of a fixed jaw, a movable jaw opposing the fixed jaw, and an interior space between the fixed jaw and the movable jaw, wherein the movable jaw has a spaced apart position relative to the fixed jaw and a proximate position relative to the fixed jaw, wherein the pair of jaws has an opened configuration when the movable jaw is in the spaced apart position and a closed configuration when the moveable jaw is in the proximate position, wherein each one of the jaws is comprised of an interior surface bounding opposite sides of the interior space, wherein the interior surface of one of the locking jaws is comprised of a planar cross-section, wherein the interior surface of the other of the locking jaws comprises at most a single notch, wherein the interior space has a width, a length and a maximum height when the pair of jaws is in the closed configuration, and wherein at least one of the length and the maximum height is increased and forms an opening to the interior space between the pair of jaws when in the opened configuration;
an elongated handgrip fixedly connected to the fixed jaw proximate to a first side of the fixed jaw, and wherein the elongated handgrip extends away from the first side of the fixed jaw along a first longitudinal axis;
a trigger handle extending away from the first side of the fixed jaw along a second longitudinal axis in the same direction as the first longitudinal axis of the elongated handgrip when the pair of jaws are in the opened configuration and when the pair of jaws are in the closed configuration, wherein the second longitudinal axis of the trigger handle is aligned with the first longitudinal axis of the elongated handle within an acute angle when the pair of jaws are in the opened configuration and when the pair of jaws are in the closed configuration, and wherein the trigger handle is pivotally mounted to at least one of the fixed jaw and the movable jaw; and
an actuator operatively connected to the elongated handgrip proximate to the first side of the fixed jaw, wherein the actuator comprises a linkage connecting the trigger handle to the elongated handgrip wherein the actuator moves the pair of jaws between the opened configuration and the closed configuration, and wherein the elongated handgrip extends outwardly away from the actuator.

10. The clamp of claim 9, further comprising a handle spring and a clamp release, wherein the handle spring is connected at a first end to at least one of the trigger handle and the elongated handgrip and is connected at a second end to at least one of the linkage and the movable jaw when the first end is connected to the trigger handle and the elongated handgrip, respectively, and wherein the clamp release is comprised of a release lever rotatably connected to the trigger handle with a first end engaging the linkage when the jaws are in the closed configuration.

11. The clamp of claim 9, further comprising a mount connected to or formed as a part of at least one of the pair of jaws.

12. The clamp of claim 11, wherein the mount is further comprised of at least one of a slot extending through at least one of the fixed jaw and the moveable jaw, the notch in the interior surface in at least one of the fixed jaw and the moveable jaw, and a bracket connected to at least one of the fixed jaw and the moveable jaw, and wherein the single notch comprises another planar cross-section.

13. The clamp of claim 9, wherein the elongated handgrip has a span that is the same order of magnitude as the length of the interior space in the closed configuration, wherein the trigger handle has a length at least half as long as the span of the elongated handgrip, wherein proximal ends of the elongated handgrip and the trigger handle adjacent to the actuator are spaced by a distance that is less than the span of the trigger handle, wherein the roof rack bar fits through the opening in the opened configuration, and wherein the roof rack bar is contacted by the interior surface of the pair of jaws when in the closed configuration, and wherein the width is one of approximately equal to the maximum height and greater than the maximum height in the closed configuration.

14. The clamp of claim 9, wherein the acute angle between the first longitudinal axis and the second longitudinal axis is less than 45° when the pair of jaws are in the opened configuration and when the pair of jaws are in the closed configuration, and wherein the trigger handle rotates relative to the elongated handgrip between a first position and a second position within the acute angle when the pair of jaws are in the opened configuration and in the closed configuration.

15. The clamp of claim 9, further comprising an adjustment knob situated at a back end of the elongated handgrip opposite from the fixed jaw, wherein the adjustment knob engages a bearing surface at a distal end of the linkage which is connected to the elongated handgrip, and wherein a movement of the adjustment knob causes a longitudinal distance of the distal end to move relative to the back end and varies the distance between the movable jaw and the fixed jaw in the closed configuration.

16. The clamp of claim 9, further comprising a lock attached to at least one of the fixed jaw, the movable jaw, the elongated handgrip, and the trigger handle, wherein lock has a locked configuration preventing the pair of jaws from moving from the closed configuration to the opened configuration and has an unlocked configuration permitting movement of the pair of jaws from the closed configuration to the opened configuration.

17. A clamp for connecting to a roof rack bar, comprising:
a pair of jaws comprised of a fixed jaw, a movable jaw opposing the fixed jaw, and an interior space between the fixed jaw and the movable jaw, wherein the movable jaw has a spaced apart position relative to the fixed jaw and a proximate position relative to the fixed jaw, wherein the pair of jaws has an opened configuration when the movable jaw is in the spaced apart position and a closed configuration when the moveable jaw is in the proximate position, wherein each one of the jaws is comprised of an interior surface bounding opposite sides of the interior space, wherein the interior surface of one of the locking jaws is comprised of a planar cross-section, wherein the interior surface of the other of the locking jaws comprises a single notch, wherein the interior space has a width, a length and a maximum height when the pair of jaws is in the closed configuration, and wherein at least one of the length and the height is increased and forms an opening to the interior space between the pair of jaws when in the opened configuration;
an elongated handgrip fixedly connected to the fixed jaw proximate to a first side of the fixed jaw, and wherein the elongated handgrip extends away from the first side of the fixed jaw along a first longitudinal axis;
a trigger handle extending away from the first side of the fixed jaw along a second longitudinal axis in the same direction as the first longitudinal axis of the elongated handgrip when the pair of jaws are in the opened configuration and when the pair of jaws are in the closed configuration, wherein the second longitudinal axis of the trigger handle is aligned with the first longitudinal axis of the elongated handle within an acute angle when the pair of jaws are in the opened configuration and when the pair of jaws are in the closed configuration, and wherein the trigger handle is pivotally mounted to at least one of the fixed jaw and the movable jaw;

an actuator operatively connected to the elongated handgrip proximate to the first side of the fixed jaw, wherein the actuator comprises a linkage connecting the trigger handle to the elongated handgrip, wherein the actuator moves the pair of jaws between the opened configuration and the closed configuration, and wherein the elongated handgrip extends outwardly away from the actuator; and an adjustment knob situated at a back end of the elongated handgrip opposite from the fixed jaw, wherein the adjustment knob engages a bearing surface at a distal end of the linkage which is connected to the elongated handgrip, and wherein a movement of the adjustment knob causes a longitudinal distance of the distal end to move relative to the back end and varies the distance between the movable jaw and the fixed jaw in the closed configuration.

18. The clamp of claim 17, further comprising a handle spring and a clamp release, wherein the handle spring is connected at a first end to at least one of the trigger handle and the elongated handgrip and is connected at a second end to at least on of the linkage and the movable jaw when the first end is connected to the trigger handle and the elongated handgrip, respectively, and wherein the clamp release is comprised of a release lever rotatably connected to the trigger handle with a first end engaging the linkage when the jaws are in the closed configuration.

19. The clamp of claim 17, wherein the elongated handgrip has a span that is the same order of magnitude as the length of the interior space in the closed configuration, wherein the trigger handle has a length at least half as long as the span of the elongated handgrip, wherein proximal ends of the elongated handgrip and the trigger handle adjacent to the actuator are spaced by a distance that is less than the span of the trigger handle, wherein the roof rack bar fits through the opening in the opened configuration, and wherein the roof rack bar is contacted by the interior surface of the pair of jaws when in the closed configuration.

20. The clamp of claim 17, further comprising a mount connected to or formed as a part of at least one of the pair of jaws and a lock attached to at least one of the fixed jaw, the movable jaw, the elongated handgrip, and the trigger handle, wherein the mount is further comprised of at least one of a slot extending through at least one of the fixed jaw and the moveable jaw, the notch in the interior surface in one of the fixed jaw and the moveable jaw, and a bracket connected to at least one of the fixed jaw and the moveable jaw, wherein the lock has a locked configuration preventing the pair of jaws from moving from the closed configuration to the opened configuration and has an unlocked configuration permitting movement of the pair of jaws from the closed configuration to the opened configuration, and wherein the single notch comprises another planar cross-section.

* * * * *